(12) United States Patent
Miller et al.

(10) Patent No.: US 6,987,781 B1
(45) Date of Patent: Jan. 17, 2006

(54) METHODS AND SYSTEMS FOR ROUTING SIGNALING MESSAGES IN A COMMUNICATIONS NETWORK USING CIRCUIT IDENTIFICATION CODE (CIC) INFORMATION

(75) Inventors: Paul Andrew Miller, Raleigh, NC (US); Venkataramaiah Ravishankar, Raleigh, NC (US); Peter Joseph Marsico, Carrboro, NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 09/559,767

(22) Filed: Apr. 27, 2000

Related U.S. Application Data

(63) Continuation-in-part of application No. 09/443,712, filed on Nov. 19, 1999, and a continuation-in-part of application No. 09/205,809, filed on Dec. 4, 1998, now Pat. No. 6,324,183.

(60) Provisional application No. 60/131,254, filed on Apr. 27, 1999, and provisional application No. 60/127,889, filed on Apr. 5, 1999.

(51) Int. Cl.
*H04J 1/14* (2006.01)

(52) U.S. Cl. .............. 370/496; 370/352; 370/252; 379/88.17; 379/230

(58) Field of Classification Search ......... 370/352–356, 370/400, 401, 252, 386, 467, 496, 385, 466, 370/397, 395.3, 407, 360; 379/88.17, 230, 379/115.01, 112.01, 229
See application file for complete search history.

(56) References Cited

U.S. PATENT DOCUMENTS

| 5,008,929 A | 4/1991 | Olsen et al. |
| 5,142,622 A | 8/1992 | Owens |

(Continued)

FOREIGN PATENT DOCUMENTS

| CA | 2239764 | 12/1998 |
| EP | 0 853 411 A2 | 7/1998 |

(Continued)

OTHER PUBLICATIONS

O'Shea, "Mating Season," Telephony, p. 10–11, (Sep. 20, 1999).

Lakshmi-Ratan, "The Lucent Technologies Softswitch-Realizing the Promise of Convergence," Bell Labs Technical Journal, p. 174–195, (Jun. 4, 1999).

(Continued)

*Primary Examiner*—John Pezzlo
(74) *Attorney, Agent, or Firm*—Jenkins, Wilson & Taylor P.A

(57) ABSTRACT

A routing node for receiving, processing, and subsequently transmitting Signaling System 7 (SS7) signaling messages destined for a Media Gateway Controller (MGC) type network element is disclosed. A Circuit Identification Code (CIC) routing node is adapted to receive an ISUP message from an associated SS7 network and determine the routing destination of the message based, at least in part, on a CIC parameter value contained within the message. The ISUP message is subsequently encapsulated in an Internet Protocol (IP) envelope and transmitted to a destination node via an IP communication link. Such a CIC routing node also provides network service providers with a method of generally eliminating the need for the assignment of unique SS7 network point codes to each MGC node in a network. That is, a CIC routing node allows multiple MGC nodes to effectively correspond to a single SS7 network point code.

96 Claims, 11 Drawing Sheets

U.S. PATENT DOCUMENTS

| | | |
|---|---|---|
| 5,208,811 A | 5/1993 | Kashio et al. |
| 5,239,542 A | 8/1993 | Breidenstein et al. |
| 5,315,641 A | 5/1994 | Montgomery et al. |
| 5,384,840 A | 1/1995 | Blatchford |
| 5,420,916 A | 5/1995 | Sekiguchi |
| 5,430,727 A | 7/1995 | Callon |
| 5,509,010 A | 4/1996 | LaPorta et al. |
| 5,568,487 A | 10/1996 | Sitbon et al. |
| 5,581,558 A | 12/1996 | Horney, II et al. |
| 5,583,927 A | 12/1996 | Ely et al. |
| 5,586,177 A | 12/1996 | Farris et al. |
| 5,638,431 A | 6/1997 | Everett et al. |
| 5,640,446 A | 6/1997 | Everett et al. |
| 5,651,002 A | 7/1997 | Van Seters et al. |
| 5,657,452 A | 8/1997 | Kralowetz et al. |
| 5,664,102 A | 9/1997 | Faynberg |
| 5,675,635 A | 10/1997 | Vos et al. |
| 5,680,552 A | 10/1997 | Netravali et al. |
| 5,696,809 A | 12/1997 | Voit |
| 5,701,301 A | 12/1997 | Weisser, Jr. |
| 5,706,286 A | 1/1998 | Reiman et al. |
| 5,712,903 A | 1/1998 | Bartholomew et al. |
| 5,732,213 A | 3/1998 | Gessel et al. |
| 5,740,374 A | 4/1998 | Raffali-Schreinemachers |
| 5,761,281 A | 6/1998 | Baum et al. |
| 5,761,500 A | 6/1998 | Gallant et al. |
| 5,764,750 A | 6/1998 | Chau et al. |
| 5,764,955 A | 6/1998 | Doolan |
| 5,768,361 A | 6/1998 | Cowgill |
| 5,768,525 A | 6/1998 | Kralowetz et al. |
| 5,774,695 A | 6/1998 | Autrey et al. |
| 5,781,534 A | 7/1998 | Perlman et al. |
| 5,787,255 A | 7/1998 | Parlan et al. |
| 5,793,771 A | 8/1998 | Darland et al. |
| 5,802,285 A | 9/1998 | Hirviniemi |
| 5,805,587 A | 9/1998 | Norris et al. |
| 5,809,028 A | 9/1998 | Nethercott et al. |
| 5,812,781 A | 9/1998 | Fahlman et al. |
| 5,815,669 A | 9/1998 | Lee et al. |
| 5,828,844 A | 10/1998 | Civanlar et al. |
| 5,838,782 A | 11/1998 | Lindquist |
| 5,852,660 A | 12/1998 | Lindquist et al. |
| 5,867,495 A | 2/1999 | Elliott et al. |
| 5,870,565 A | 2/1999 | Glitho |
| 5,872,782 A | 2/1999 | Dendi |
| 5,878,129 A | 3/1999 | Figurski et al. |
| 5,889,954 A | 3/1999 | Gessel et al. |
| 5,892,822 A | 4/1999 | Gottlieb et al. |
| 5,912,887 A | 6/1999 | Sehgal |
| 5,917,900 A | 6/1999 | Allison et al. |
| 5,920,562 A | 7/1999 | Christie et al. |
| 5,923,659 A | 7/1999 | Curry et al. |
| 5,926,482 A | 7/1999 | Christie et al. |
| 5,940,598 A | 8/1999 | Strauss et al. |
| 5,949,871 A | 9/1999 | Kabay et al. |
| 5,958,016 A | 9/1999 | Chang et al. |
| 5,974,052 A | 10/1999 | Johnson et al. |
| 5,991,301 A | 11/1999 | Christie |
| 5,995,608 A | 11/1999 | Detampel, Jr. et al. |
| 6,006,098 A | 12/1999 | Rathnasabapathy et al. |
| 6,011,780 A | 1/2000 | Vaman et al. |
| 6,011,794 A | 1/2000 | Mordowitz et al. |
| 6,011,803 A | 1/2000 | Bicknell et al. |
| 6,021,126 A | 2/2000 | White et al. |
| 6,023,502 A | 2/2000 | Bouanaka et al. |
| 6,026,091 A | 2/2000 | Christie et al. |
| 6,028,921 A | 2/2000 | Malik et al. |
| 6,047,005 A | 4/2000 | Sherman et al. |
| 6,064,653 A | 5/2000 | Farris |
| 6,067,546 A | 5/2000 | Lund |
| 6,069,890 A | 5/2000 | White et al. |
| 6,075,783 A | 6/2000 | Voit |
| 6,078,582 A | 6/2000 | Curry et al. |
| 6,079,036 A | 6/2000 | Moharram |
| 6,084,892 A | 7/2000 | Benash et al. |
| 6,084,956 A | 7/2000 | Turner et al. |
| 6,094,437 A | 7/2000 | Loehndorf, Jr. et al. |
| 6,097,719 A | 8/2000 | Benash et al. |
| 6,097,805 A | 8/2000 | Figurski et al. |
| 6,111,870 A | 8/2000 | Kurtz |
| 6,111,893 A * | 8/2000 | Volftsun et al. ............ 370/466 |
| 6,112,090 A | 8/2000 | Valentine |
| 6,115,383 A | 9/2000 | Bell et al. |
| 6,118,779 A | 9/2000 | Madonna |
| 6,118,780 A | 9/2000 | Dunn et al. |
| 6,119,160 A | 9/2000 | Zhang et al. |
| 6,122,255 A | 9/2000 | Bartholomew et al. |
| 6,122,263 A | 9/2000 | Dahlin et al. |
| 6,122,365 A | 9/2000 | Yegoshin |
| 6,125,111 A | 9/2000 | Snow et al. |
| 6,125,177 A | 9/2000 | Whittaker |
| H1880 H | 10/2000 | Vines et al. |
| H1896 H | 10/2000 | Hoffpauir et al. |
| 6,128,379 A | 10/2000 | Smyk |
| 6,134,235 A | 10/2000 | Goldman et al. |
| 6,134,246 A | 10/2000 | Cai et al. |
| 6,137,869 A | 10/2000 | Voit et al. |
| 6,137,874 A | 10/2000 | Brown et al. |
| 6,144,667 A | 11/2000 | Doshi et al. |
| 6,144,670 A | 11/2000 | Sponaugle et al. |
| 6,151,390 A | 11/2000 | Volftsun et al. |
| 6,154,467 A | 11/2000 | Hager et al. |
| 6,157,710 A | 12/2000 | Figurski et al. |
| 6,178,181 B1 | 1/2001 | Glitho |
| 6,195,425 B1 | 2/2001 | Farris |
| 6,201,804 B1 | 3/2001 | Kikinis |
| 6,208,642 B1 * | 3/2001 | Balachandran et al. ..... 370/385 |
| 6,215,783 B1 | 4/2001 | Neyman |
| 6,236,722 B1 | 5/2001 | Gilbert et al. |
| 6,292,479 B1 * | 9/2001 | Bartholomew et al. ..... 370/352 |
| 6,333,931 B1 * | 12/2001 | LaPier et al. ............... 370/385 |
| 6,411,632 B2 | 6/2002 | Lindgren et al. |
| 6,584,190 B1 | 6/2003 | Bressler |
| 6,594,258 B1 | 7/2003 | Larson et al. |
| 6,611,533 B1 | 8/2003 | Liao et al. |
| 6,674,748 B1 | 1/2004 | Dykhuizen et al. |
| 6,678,242 B1 | 1/2004 | Simon |

FOREIGN PATENT DOCUMENTS

| | | |
|---|---|---|
| WO | WO/9711563 | 3/1997 |
| WO | WO 97/33441 A1 | 9/1997 |
| WO | 97/42776 | 11/1997 |
| WO | WO 97/46045 A1 | 12/1997 |
| WO | 98/28897 | 7/1998 |
| WO | 99/09759 | 2/1999 |
| WO | WO 99/16256 A1 | 4/1999 |
| WO | WO/0022840 | 4/2000 |
| WO | WO/0030369 | 5/2000 |
| WO | WO/0031933 | 6/2000 |
| WO | WO/0033519 | 6/2000 |
| WO | WO/0056032 | 9/2000 |

OTHER PUBLICATIONS

Hamdi et al., "Voice Service Interworking for PSTN and IP Networks," IEEE Communications Magazine, p. 104–111, (May 26, 1999).

Tekelec, "Eagle (Registered) Feature Guide," PN/9110–1225–01, (Jan. 26, 1998).

Tekelec, "Eagle (Registered) STP Platform," 908–0126–01, (1997).

Tekelec, "STPLan Interface Feature," 908–0134–01, (1997).
Tekelec, "STP Database Transport Access Feature," 908–0136–01, (1997).
Tekelec, "STP X.25 to SS7–IS.41 Protocol Conversion Feature," 908–0135–01, (1997).
Tekelec, "STP Ansi–Itu Gateway Feature," 908–0133–01, (1997).
Tekelec, "SS7–Frame Relay Access Device SS7 Protocol Information Translator," 908–0167–01, (1997).
Anonymous, "Around the Loop," Telephony, p. 26, (Jul. 22, 1996).
Zaharychuk et al., "Gateway Signal Transfer Points: Design, Services and Benefits," IEEE, p. 223.2.1–223.2.8, (1990).
Bootman et al., "Generic Building Blocks for the Telecommunications Management Networks," IEEE, p. 6.1.1–6.1.5, (1988).
Bootman, "Intelligent Network Services Using a Service Switching Node," IEEE, p. 40.7.1–40.2.4, (1998).
Buckles, "Very High Capacity Signaling Transfer Point For Intelligent Network Services," IEEE, p. 40.2.1–40.2.4, (1988).
O'Shea, "The Network that's Never Done," Telephony, p. 38–43, (Sep. 15, 1997).
Snyder, "Rerouting Internet Traffic Jams," Telephony, p. 12, (Nov. 11, 1996).
Snyder, "Branded with Optics," Telephony, p. 49–50, (Jul. 22, 1996).
Michael McGrew, "Transport SS7 Signaling Over IP," Lucent Technologies Inc., p. 1–8,, (Nov. 1998).
Curevo et al., "SS7–Internet Interworking—Architectural Framework," p. 1–9, (Jul. 1998).
"Ericsson Announces General Availability of Its Mobile Advantage Wireless Office System," Ericsson Press Release, pp. 1–2 (Nov. 4, 1999).
Johanson et al., "Mobile Advantage Wirless Office—A Digital Wireless Office System for TDMA/136 Networks," Ericsson Review No. 1, pp. 20–27 (1999).
Publication by *Tekelec* entitled "Eagle® Feature Guide," Publication PN9110–1225–01 (Jan., 1998).
Publication by *Tekelec* entitled "Eagle® STP Platform," Publication 908–0126–01 (1997).
Publication by *Tekelec* entitled "STP Lan Interface Feature," Publication 908–0134–01 (1997).
Publication by *Tekelec* entitled "STP Database Transport Access Feature," Publication 908–0136–01 (1997).
Publication by *Tekelec* entitled "STP X.25 to SS7–IS.41 Protocol Conversion Feature," Publication 908–0135–01 (1997).
Publication by *Tekelec* entitled "STP Ansi–Itu Gateway Feature," Publication 908–0133–01 (1997).
Publication by *Tekelec* entitled "SS7–Frame Relay Access Device SS7 Protocol Information Translator," Publication 908–0167–01 (1997).

Pai, "In–Building Wirelses: The Next Generation," TelephonyOnline.com, pp. 1–4 (Jun. 30, 2004).
Handa, "In Building Wireless: The Next Generation," TMCnet.com, pp. 1–7 (Feb. 12, 2004).
Ftichard, "A New Voice in the Boardroom," Wireless Review, pp. 1–3 (Sep. 1, 2003).
"Fixed Wireless Technology," ISP Planet, pp. 1–4 (May 14, 2002).
Martinek, "Office on the Fly," Wireless Review, pp. 1–4 (Jul. 15, 2001).
"March Networks 3300 Integrated Communications Platform," Mitel Networks Corporation, pp. 1–34 (Jul. 2001).
Swartz, "Ready, Set, Wireless Office?," Wireless Review, pp. 1–4 (Jun. 1, 2000).
"Telstra and Ericsson Trial Next Generation Wireless Office Solution," Ericsson, pp. 1–2 (Apr. 28, 2000).
"Mitel and Ericsson Join Forces to Deliver an Integrated Digital Wireless Office Solution with PBX Functionality-Company Business and Marketing," Cambridge Telcom Report, pp. 1–4 (Apr. 24, 2000).
"Market and Development Agreement Targets Customers Looking for Ways to Become More Productive Through Convenient and Cost–Effective Communication," Ericsson Press Release, pp. 1–2 (Apr. 4, 2000).
Sulkin, "Emerging Options for Wireless PBXs," Voice2000, pp. 1–8 (Feb. 2000).
Drzewianowski, "WLANs –For the Picking," Communications Solutions™ Next–Gen Networks, pp. 1–9 (Jan. 2000).
"The Wireless Business Connection," Second Quarter 2000 Report, The Phillips Group –Infotech, pp. 1–9 (2000).
"Corporate Offices to Go Wireless First Australian GSM on the Net Trial," Ericsson Press Release, pp. 1–3 (Aug. 11, 1999).
"Ericsson Solution Chosen for World's First Combined DECT/GSM Communications Service," Ericsson, pp. 1–9 (Jun. 21, 1999).
"Enterprise IP Gateway," Ericsson, pp. 1–6 (1999).
"The Ericsson IPT System," Ericsson, pp. 1–8 (1999).
"Wireless: Top Ericsson Executives Lay Out Corporate Vision, Unveil Strategy for the Enterprise Customer–Company Business and Marketing," EDGE, On & About AT&T, pp. 1–5 (Nov. 30, 1998).
"Ericsson Wireless Office Services to Provide Digital System Through AT&T Wireless Services," Ericsson Press Release, pp. 1–2 (Apr. 17, 1998).
Woods, "Fresno Bee Still Buzzing About Wireless," TechNews, pp. 1–2 (1995).
"teleSys Announces the Compatibility of Ericsson's Mobile Advantage Wireless Office and teleSys' MACH7–IP Gateway," teleSys Software–Press Release, pp. 1–2 (Publication Date Unknown).

* cited by examiner

CIC ROUTING DATABASE (CRD)   320

| KEY | | | DATA FIELDS | | | |
|---|---|---|---|---|---|---|
| OPC | DPC | CIC | Hostname | Port | Status | Accounting |
| 1-1-1 | 1-1-2 | 1 | 101.10.10.5 | 23 | IS | Yes |
| 1-1-1 | 1-1-2 | 2 | 101.10.20.12 | 34 | OOS | Yes |
| 1-1-1 | 1-1-2 | 3 | 101.10.23.45 | 45 | IS | No |
| 1-1-1 | 1-1-2 | 4 | 101.10.13.7 | 78 | IS | Yes |

Figure 7

METHODS AND SYSTEMS FOR ROUTING SIGNALING MESSAGES IN A COMMUNICATIONS NETWORK USING CIRCUIT IDENTIFICATION CODE (CIC) INFORMATION

RELATED-APPLICATION INFORMATION

This application is a continuation-in-part of U.S. patent application Ser. No. 09/205,809, filed Dec. 4, 1998 (issued U.S. Pat. No. 6,324,183), and a continuation-in-part of U.S. patent application Ser. No. 09/443,712, filed Nov. 19, 1999 (pending), which claims the benefit of U.S. Provisional Patent Application No. 60/127,889, filed Apr. 5, 1999, and this application further claims the benefit of U.S. Provisional Patent Application No. 60/131,254 filed Apr. 27, 1999, the disclosures of each of which are incorporated herein by reference in their entirety.

TECHNICAL FIELD

The present invention relates to the routing of signaling messages in a communications network, and more particularly to methods and systems for routing a signaling message based, in part, on Circuit Identification Code (CIC) information contained within the message.

BACKGROUND ART

Shown in FIG. 1 is a simplified telecommunications network, generally indicated by the numeral 100, that illustrates the basic process and network components involved in the placement of a typical voice-type call. Telecommunications network 100 includes both a calling party (CgPA) 102 and a called party (CdPA) 104. Calling party 102 is communicatively coupled to an originating End Office (EO) or Service Switching Point (SSP) 106, while called party 104 is similarly connected to a terminating EO or SSP 108. Originating SSP 106 and terminating SSP 108 are, in turn, connected via voice-grade communication trunks or links to a tandem switching office 110. SSP 106 and SSP 108 are also connected via signaling links to a Signal Transfer Point (STP) 112. Those skilled in the art of telecommunication network design and operation will appreciate that a typical call setup process begins when calling party 102 goes off-hook and begins dialing a telephone number associated with the called party 104. As such, originating SSP 106 receives and interprets the digits dialed by calling party 102 and subsequently selects one of a plurality of voice-grade links for use with the attempted call. Having selected and reserved a specific voice grade link, SSP 106 then formulates an Integrated Service Digital Network (ISDN) User Part (ISUP) Initial Address Message (IAM) that is intended, at least in part, to communicate or coordinate voice-grade link selection with the tandem switching office 110. Such an ISUP IAM message is typically transported via a Signaling System 7 (SS7) signaling link to STP 112. STP 112 receives the message, examines the message routing label or address header information contained therein, and simply routes the message to the specified destination address which, in this case, corresponds to tandem switching office 110. Using the voice-grade link selection information contained within the ISUP IAM message, tandem switching office 110 is able to reserve the specified link, and consequently a voice-grade communication path is established between SSP 106 and tandem switching office 110. In a similar manner, ISUP messages are transmitted and received by tandem switching office 110, STP 112, and SSP 108 such that a voice-grade communication path is also established between tandem switching office 110 and the terminating SSP 108. Once all of the necessary voice-grade links have been acquired and placed in service, call setup is considered complete and calling party 102 is able to engage in speech-type communication with the called party 104.

While the simplified network shown in FIG. 1 is indicative of the function and service traditionally provided by the Public Switched Telephone Network (PSTN), the present network increasingly carries data, including communications to and from the Internet or World Wide Web (WWW). Furthermore, as the overall performance and reliability of the Internet has improved, so has the incentive to make use of the Internet for the purposes of communicating voice-type calls.

FIG. 2 illustrates one of the most common call flow pathways associated with such "Internet calls", as described above. More particularly, FIG. 2 includes a communication network generally indicated by the numeral 150. Network 150 is further comprised of both a calling party 152 and a called party ISP 158. Calling party 152 is communicatively coupled to the originating EO or SSP 106, while called party ISP 158 is similarly connected to the terminating EO or SSP 108. Originating SSP 106 and terminating SSP 108 are, in turn, connected via voice-grade communication trunks or links 154 and 156, respectively, to a tandem switching office 110. SSP 106, SSP 108 and tandem switching office 110 are also connected via signaling-grade links to the STP 112.

As previously discussed, call setup is effected between the involved network elements through the use of an appropriate sequence of SS7 signaling messages. In the example shown in FIG. 2, it will be appreciated that although the call is not voice-related the communication links that are allocated and effectively comprise the call pathway are voice-grade links 154 and 156. More particularly, in order for calling party 152 to obtain access to the data network 160, a telephony service provider must employ or utilize some portion of their available voice-grade trunking resources. While functional, such a call scenario is unattractive to telephony service providers for a number of reasons. The two most significant reasons being that expensive, voice-grade trunks are being monopolized to carry data-grade traffic that could otherwise be transported on less expensive data-grade trunks, and that such a scenario creates "convergence" problems at the terminating end office facility, SSP 108. With particular regard to the "convergence" phenomena, it will be appreciated that at any given time, a plurality of calls to an ISP could be placed by a plurality of calling parties where each calling party is serviced by a different originating End Office or SSP. As such, it is possible that the volume of calls facilitated by any individual originating SSP is relatively light. However, it will be appreciated that the terminating SSP which is servicing the called party ISP is required to simultaneously handle or make available sufficient voice-grade trunking to accommodate all of the calls placed by the calling parties. As such, call related traffic is said to "converge" at the terminating SSP that is servicing the called party ISP. Thus, in general, the more Internet service subscribers an ISP is able to recruit, the more severe the terminating SSP or EO convergence problem.

Consequently, there is a significant incentive for telephony service providers to implement new network architectures and equipment that enable both non-voice and voice type calls to be connected or completed via data-grade trunking as opposed to traditional voice-grade trunking. With particular regard to the problem of transporting voice-type traffic through a data network, it will be appreciated that the network architecture illustrated in FIG. 3 has been previously proposed and implemented to provide such "voice over IP" call functionality.

Shown in FIG. 3 is a communications network generally indicated by the numeral 180 which includes components of traditional PSTN type networks as well as traditional data networks such as the Internet 160. Furthermore, network 180 includes a collection of inter-networking elements intended to facilitate communication between the PSTN and data network 160. More specifically, network 180 includes a calling party terminal 102, and a called party terminal 104. Calling party 102 is communicatively coupled to an originating SSP 106, and in a similar manner, called party 104 is communicatively coupled to a terminating SSP 108. SSPs 106 and 108 are in turn connected to an STP 112 via SS7 signaling links. Those skilled in the art of telephony communications will appreciate that such components are typically incorporated within a traditional PSTN type network.

Also coupled to STP 112 are a pair of Media Gateway Controller (MGC) nodes 182 and 184. The MGC nodes provide inter-connectivity and inter-networking functionality between PSTN type network components and data network 160. More particularly, MGC 182 is assigned a unique SS7 Point Code (PC) of 1-1-2 and is connected to STP 112 via a dedicated SS7 signaling link. In a similar manner, MGC 184 is assigned a unique PC of 1-1-3 and is coupled to STP 112 via an SS7 communication link. As such, MGC 182 and MGC 184 are adapted to receive, process and respond to SS7 call setup/teardown signaling messages. Further coupled to MGCs 182 and 184 via signaling links are Media Gateways (MGs) 186 and 188, respectively. It will be appreciated from FIG. 3 that each MG element includes at least three communication interfaces. More specifically, MG 186 is adapted to communicate via a data-grade trunk with SSP 106. MG 186 is also adapted to communicate via a signaling link with MGC 182, while communicating via a data-grade link with data network 160. In a similar manner MG 188 is coupled to SSP 108 via a data-grade trunk, to MGC 184 via a signaling link, and to data network 160 via a data-grade link.

As such, MGC 182 Is able to signal MG 186 in a manner so as to cause MG 186 to establish a data-grade trunk connection with SSP 106, thereby providing a SSP 106 with access to data network 160 without requiring the use of any voice-grade circuit or trunk resources. In a similar manner, MGC 184 and MG 188 provide SSP 108 with the same benefits.

It will be appreciated that in a less optimized configuration, the communication trunking between the SSPs (106 and 108) and the MGs (186 and 188) could be voice-grade. While such a configuration constitutes a less optimized solution than an all data-grade trunk pathway, benefits may still be realized by eliminating the use of tandem office connected voice-grade trunks in scenarios that would ordinarily require multiple tandem offices to be involved in the completion of a call.

From an operational perspective, it should be noted that in practice, both data and voice trunks connected to an SSP or End Office are actually comprised of multiple communication channels or pathways which are commonly referred to as communication circuits. Within any given trunk, these individual communication circuits are identified by a parameter known as a Circuit Identification Code (CIC).

In the example shown in FIG. 3, the establishment of a "call" involves the selection of a particular circuit in a trunk that directly or indirectly facilitates connection of the calling or originating SSP 106 and called or terminating SSP 108. For example, if subscriber 102 that Is serviced by SSP 106 wishes to place a call to another subscriber 104 that is serviced by SSP 108, an SS7 signaling message is formulated and sent from SSP 106 via STP 112 to MGC 182. More specifically, an ISUP IAM message is formulated by SSP 106 indicating that a particular trunk circuit has been selected and reserved for use with the requested call. Within the IAM message, the chosen trunk circuit is indicated by a CIC parameter. The SS7 ISUP IAM message is addressed to the unique SS7 point code associated with MGC 182, which in this example is 1-1-2.

It should be appreciated that the STP 112 simply receives the ISUP IAM signaling message from SSP 106 and routes the message out the appropriate signaling link to MGC 182 based on the Destination Point Code (DPC) specified In the message. Once again, In this example, the DPC of the ISUP IAM message is 1-1-2.

In general, MGC 182 receives the ISUP IAM message and examines the CIC parameter. Based on the CIC value included in the SS7 signaling message, MGC 182 subsequently signals the MG node that is adapted to communicate with SSP 106 via the specified trunk circuit. In this example, the ISUP IAM message is assumed to specify a CIC value that is representative of a trunk circuit maintained by MG 186. Consequently, after receiving the ISUP IAM message, MGC 182 further sends a signaling message to MG 186 so as to generally instruct MG 186 to reserve the trunk circuit requested by SSP 106.

In a similar manner, SS7 ISUP messages are also between MGC 182, MGC 184, and terminating SSP 108 so as to effectively establish a call pathway between the calling party 102 and called party 104. In this case, the calling pathway includes, at least in part, a data network component and furthermore does not require an Internet Service Provider (ISP) to provide access to this data network component.

While the network architecture described above offers numerous benefits over previous "Internet call" processing implementations, one significant limitation of such an architecture involves the requirement that each MGC node be assigned a unique SS7 network address or point code (PC). With the rapid expansion of the PSTN, SS7 point codes have become a scarce resource. Consequently, it is not always feasible for a telephone network operator to implement new network architectures or network growth plans that require the acquisition of numerous new SS7 point codes.

Therefore, what is needed is a system and method of establishing calls, at least in part, through a data network using inter-networking nodes that do not require unique SS7 point codes.

DISCLOSURE OF THE INVENTION

According to one aspect, the present invention includes a communications network element that is capable of generally routing messages to a Media Gateway Controller (MGC). More particularly, the communications network element, referred to herein as a Circuit Identification Code (CIC) routing node, is capable of receiving an SS7 message via an SS7 signaling link from another node connected to an SS7 signaling network. The CIC routing node is adapted to make a routing decision that is based, at least in part, on the value of a CIC parameter specified in the SS7 message. The CIC routing node is further adapted to encapsulate the routed message in an Internet Protocol (IP) envelope and transmit the encapsulated SS7 message over an IP communication link to a predetermined MGC node. The CIC routing node includes a communication module or modules capable of transmitting and receiving data packets over both SS7 and IP networks. A message routing process examines Originating Point Code (OPC), Destination Point Code (DPC), and Circuit Identification Code (CIC) values contained in incoming ISUP IAM data packets and subsequently directs these packets to the appropriate outbound communication link for transmission to the appropriate MGC. As the routing key employed for ISUP IAM messages in the CIC routing node is a triplet (OPC, DPC, CIC), each MGC is not required to have a unique SS7 point code, instead each MGC is represented by a unique combination of sending node address (OPC), self-address (DPC), and trunk circuits serviced (CIC).

The functions for providing CIC based routing decisions are described herein as modules or processes. It Is understood that these modules or processes may be implemented as computer-executable instructions embodied in a computer-readable medium. Alternatively, the modules or processes described herein may be implemented entirely in hardware. In yet another alternative embodiment, the modules or processes described herein may be implemented as a combination of hardware and software.

The processes and modules for providing CIC based routing decisions are described below as being associated with cards or subsystems within a routing node. It is understood that these cards or subsystems include hardware for storing and executing the processes and modules. For example, each card or subsystems described below may include one or more microprocessors, such as an x86 microprocessor available from Intel Corp., and associated memory.

Accordingly, It is an object of the present invention to provide a routing node that facilitates the routing of messages to a plurality of network elements that share a common point code address.

It is yet another object of the present invention to provide a routing node that routes incoming messages based, at least in part, on a Circuit Identification Code (CIC) value contained within the message.

It is yet another object of the present invention to provide a method of routing messages based, at least in part, on a Circuit Identification Code (CIC) value contained within the message.

It is yet another object of the present invention to provide a routing node that facilitates the setting up and tearing down of voice-type calls across a data network such as the Internet.

It is yet another object of the present invention to provide a routing node that is capable of generating usage and measurements data and billing data associated with a message that is routed based, at least in part, on a CIC value contained within the message.

Some of the objects of the invention having been stated hereinabove, other objects will become evident as the description proceeds, when taken in connection with the accompanying drawings as best described hereinbelow.

BRIEF DESCRIPTION OF THE DRAWINGS

A description of embodiments of the present invention will now proceed with reference to the accompanying drawings, of which:

FIG. 7 is a table that illustrates a sample CIC Routing Database (CRD) structure and data used in a preferred embodiment of a CIC packet routing node of the present invention;

DETAILED DESCRIPTION OF THE INVENTION

Figure 4:
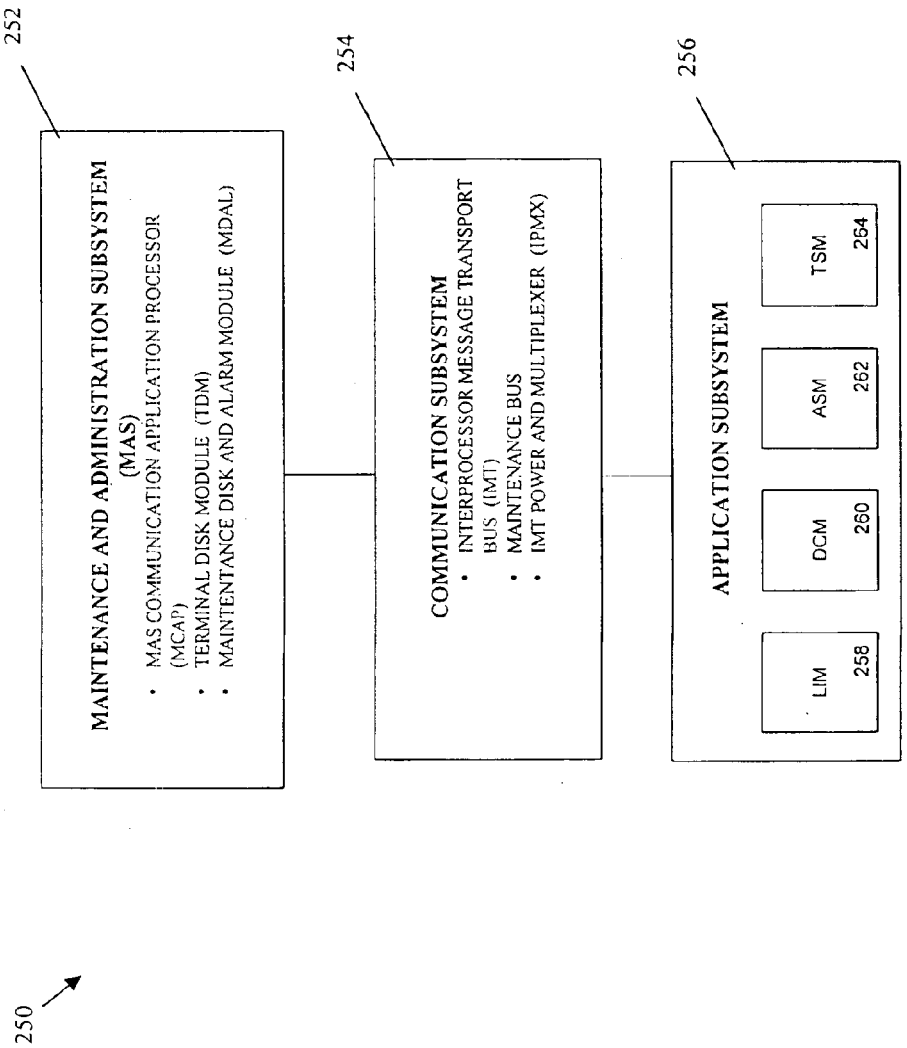
FIG. 4 is a functional block diagram of a system architecture according to a preferred embodiment of a Circuit Identification Code (CIC) packet routing node of the present invention.

Disclosed herein are several embodiments of the present invention, all of which include a network element that performs functions similar to that of a traditional telecommunications network packet routing switch, such as a Signal Transfer Point (STP). Each of the embodiments described and discussed below, employs an internal architecture similar to that of high performance STP and signaling gateway (SG) products which are marketed by the assignee of the present application as the Eagle® STP and IP$^7$ Secure Gateway™, respectively. A block diagram that generally illustrates the base internal architecture of the IP$^7$ Secure Gateway™ product is shown in FIG. 4. A detailed description of the Eagle® STP may be found in the *Eagle® Feature Guide* PN/910-1225-01, Rev. B, January 1998, published by Tekelec, Inc. of Calabasas, Calif., the disclosure of which is incorporated herein by reference in its entirety. Similarly, a detailed description of the IP$^7$ Secure Gateway™ may be found in Tekelec publication PN/909-0767-01, Rev B, August 1999, titled *Feature Notice IP$^7$ Secure Gateway™ Release 1.0*, the disclosure of which is hereby incorporated by reference. The specific functional components of an IP$^7$ Secure Gateway™ for transmitting and receiving TCAP messages over an Internet Protocol (IP) network are described in commonly-assigned, co-pending U.S. patent application Ser. No. 09/205,809, the disclosure of which is incorporated herein by reference in its entirety. As described in the above referenced *Eagle® Feature Guide*, an Eagle® STP 250 includes the following subsystems: a Maintenance and Administration Subsystem (MAS) 252, a communication subsystem 254 and an application subsystem 256. The MAS 252 provides maintenance communications, initial program load, peripheral services, alarm processing and system disks. The communication subsystem 254 includes an Interprocessor Message Transport (IMT) bus that is the main communication bus among all subsystems in the Eagle® STP 250. This high-speed communications system functions as two 125 Mbps counter-rotating serial buses.

The application subsystem 256 includes application cards that are capable of communicating with the other cards through the IMT buses. Numerous types of application cards can be incorporated into STP 250, including but not limited to: a Link Interface Module (LIM) 258 that provides SS7 links and X.25 links, a Data Communication Module (DCM) 260 that provides an Internet Protocol (IP) interface using Transmission Control Protocol (TCP), and an Application Service Module (ASM) 262 that provides global title translation, gateway screening and other services. A Translation Service Module (TSM) 264 may also be provided to support triggered local number portability service. Once again, a detailed description of the Eagle® STP is provided in the above-cited *Eagle® Feature Guide* and need not be described in detail herein. It should also be appreciated that, in addition to conventional SS7 LIM cards, a Data Communication Module (DCM) can be employed in a similar manner to provide for the transport of Internet Protocol (IP) encapsulated SS7 messages over an IP network, as described in the above referenced *Feature Notice IP$^7$ Secure Gateway™ Release* 1.0 publication. With particular regard to the TSM triggered LNP services module mentioned above, a detailed description of the Tekelec triggered LNP solution may be found in the *Feature Guide LNP LSMS* PN/910-1598-01, Rev. A, January 1998, published by Tekelec, the disclosure of which is hereby incorporated herein by reference. Furthermore, systems and methods for providing triggerless LNP functionality within a network routing node are described in commonly-assigned, co-pending U.S. patent application Ser. No. 09/053,541, the disclosure of which is incorporated herein by reference in its entirety.

CIC Routing Node Embodiment

Figure 5:
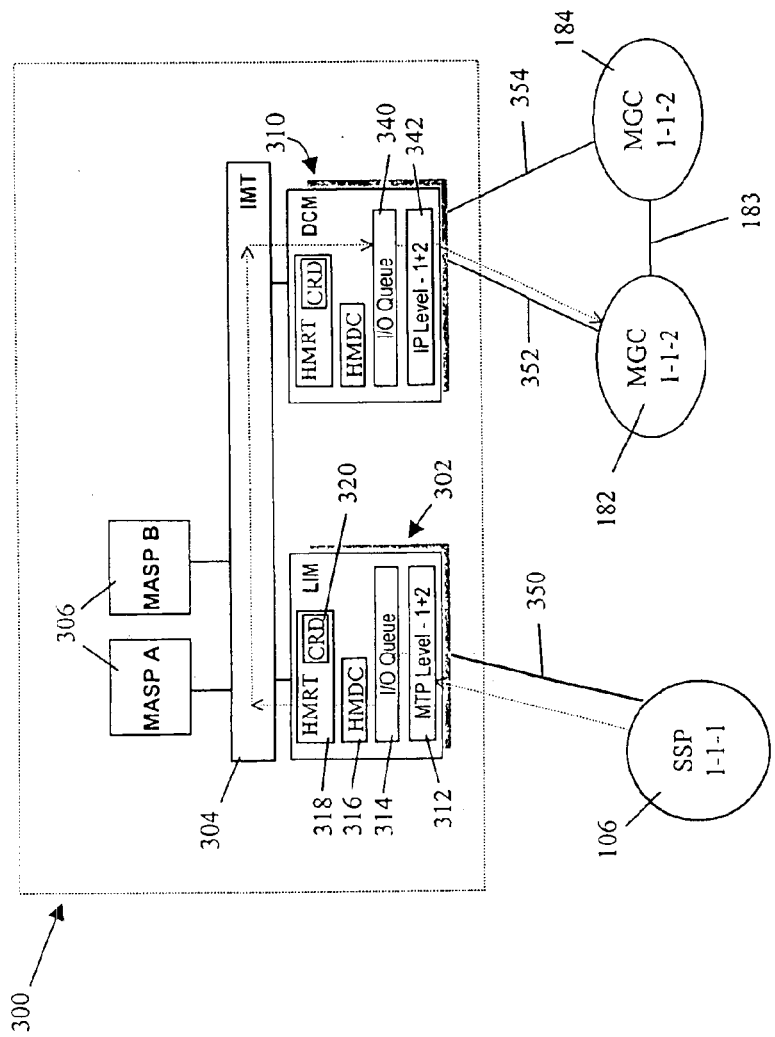
FIG. 5 is a schematic and message flow diagram of a system architecture according to a preferred embodiment of a CIC packet routing node of the present invention, generally indicating message flow associated with an incoming ISDN User Part (ISUP) Initial Address Message (IAM) message.

Shown in FIG. 5 is Circuit Identification Code (CIC) packet routing switch of the present invention that is generally indicated by the numeral 300. It will be appreciated that CIC routing node 300 is communicatively coupled to an EO or SSP 106 via an SS7 signaling link 350, to a first Media Gateway Controller (MGC) node 182 via an IP connection 352, and to a second Media Gateway Controller (MGC) node 184 via an IP connection 354. MGC nodes 182 and 184 are also communicatively coupled together via an IP link 183. It will be further appreciated that the MGC nodes 182 and 184 have an identical SS7 network address or point code, 1-1-2. Once again, those skilled in the art of telecommunication network communications will appreciate that the assignment of identical SS7 point codes to two nodes operating within the network is typically not possible. It is the CIC routing node of the present invention that directly facilitates such SS7 point code consolidation within a network, and the means by which this functionality is achieved is discussed in detail below.

As further illustrated in FIG. 5, CIC packet routing node 300 includes a high speed Interprocessor Message Transport (IMT) communications bus 304. Communicatively coupled to IMT bus 304 are a number of distributed processing modules or cards including: a pair of Maintenance and Administration Subsystem Processors (MASPs) 306, an SS7 capable Link Interface Module (LIM) 302, and an Internet Protocol (IP) capable Data Communication Module (DCM) 310. These modules are physically connected to the IMT bus 304 such that signaling and other type messages may be routed internally between all active cards or modules. For simplicity of illustration, only a single LIM 302 and DCM 310 are included in FIG. 5. However, it should be appreciated that the distributed, multiprocessor architecture of the CIC routing node 300 facilitates the deployment of multiple LIM, DCM and other cards, all of which could be simultaneously connected to and communicating via IMT bus 304.

MASP pair 306 implement the maintenance and administration subsystem functions described above. As the MASP pair 306 are not particularly relevant to a discussion of the flexible routing attributes of the present invention, a detailed discussion of their function is not provided herein. For a comprehensive discussion of additional MASP operations and functionality, the above-referenced Tekelec publications can be consulted.

Focusing now on LIM card functionality, it will be appreciated that LIM 302 is comprised of a number of sub-component processes including, but not limited to; SS7 MTP level 1 & 2 processes 312, an I/O buffer or queue 314, an SS7 MTP level 3 layer HMDC process 316, and an HMRT process 318. HMRT process 318 is generally responsible for examining an incoming message and determining to which LIM or DCM the message should be delivered for subsequent outbound transmission. Consequently, HMRT process 318 includes a CIC Routing Database (CRD) 320 that generally includes information essential to the routing of ISUP IAM messages that are destined for a MGC or similar type network element. In the particular embodiment described herein, CRD 320 employs a triplet key field structure that includes Originating Point Code (OPC), Destination Point Code (DPC), and Circuit Identification Code (CIC) as indicated in FIG. 7. Furthermore, the CRD 320 may contain a number of data fields including, but not limited to, an Internet Protocol (IP) Hostname, an IP Port, a target node Status, and an Accounting subsystem indicator. CRD database 320 could also contain information related to MGC node ownership and, consequently, message routing decisions can be based, at least in part, upon MGC node ownership.

It will be appreciated that, in the particular embodiment described herein, the HMRT process 318 is configured such that the CRD process 320 is preferably only accessed in response to the receipt of an ISUP IAM is message. Consequently, in response to receiving an ISUP IAM message that is destined for an MGC or similar node, a lookup would be performed in CRD process 320 and the resulting information returned by the CRD 320 would be used to further route the message. If an ISUP IAM message that was not destined for an MGC or similar node were received, a lookup in CRD process 320 might be performed but no matching entry would be found. In such a case, standard or conventional routing of the message would be performed in a manner similar to that described in the above referenced Eagle® STP and IP$^7$ Secure Gateway™ documents. In much the same manner, all non ISUP IAM messages received by the CIC routing node of the present invention would be routed using the techniques and processes described in the above referenced Eagle® STP and IP$^7$ Secure Gateway™ documents. As such, a detailed discussion of the standard or conventional message routing techniques and processes employed by the Eagle® STP and IP[7] Secure Gateway™ will not be discussed in detail herein.

It will be further appreciated that the routing information contained in CRD process 320 could be spread among several intermediate tables, while still achieving the same routing objectives. For instance, in one embodiment, the CIC routing information could be split into two CIC routing tables. The first CIC routing table could contain the key lookup fields (OPC, DPC, CIC), and associated with each key triplet could be an internal address corresponding to the outbound LIM or DCM card. In such a scenario, the first CIC routing table could be located within the HMRT process on the inbound LIM or DCM card. The information contained within this first CIC routing table would be used to direct an incoming message to the appropriate outbound LIM or DCM card on the IMT bus. The second CIC routing table would be located on the outbound LIM or DCM card and could again contain the key lookup fields (OPC, DPC, CIC), in addition to IP Hostname, IP Port, Status, and Accounting subsystem indicator information. In such a scenario, the second CIC routing table would appear very similar in form to the CRD structure shown in FIG. 7. Once again, the important consideration with regard to the present invention is not the specific implementation of the CRD database, but rather the fact that incoming messages are routed to a specific destination based on OPC, DPC, and CIC parameters contained therein.

With further regard to the routing key used the CIC routing node to determine the actual destination MGC node, it will be appreciated by those skilled in the art of telecommunication network communications that in the case where all MGC nodes coupled to a CIC routing node control MG nodes that are connected to a single SSP, the routing key employed by the CIC routing node could be comprised of only DPC and CIC values. In such a case, an OPC value is not required to uniquely identify the appropriate destination MGC node.

MTP level 1 and 2 process 312 provides the facilities necessary to send and receive digital data over a particular physical media/physical interface, as well as to provide error detection/correction and sequenced delivery of all SS7 message packets. I/O queue 314 provides for temporary buffering of incoming and outgoing signaling message packets. MTP level 3 HMDC process 316 receives signaling messages from the lower processing layers and performs a discrimination function, effectively determining whether an incoming SS7 message packet requires internal processing or is simply to be through switched. As discussed in detail above, the HMRT process 318 and associated CRD process 320 determine to which MGC node a particular ISUP IAM message should be routed based on the OPC, DPC, and CIC parameters contained therein, and more particularly to which outbound LIM or DCM card the message must be internally routed in order to reach the target MGC node. Once again, it should be appreciated that a LIM card may contain more functional processes than those described above. The above discussion is limited to LIM functionality associated with the basic processing of in-bound signaling messages.

DCM 310, shown in FIG. 5, generally includes an I/O buffer or queue 340 and an IP level 1 & 2 process 342. It will be appreciated that outgoing message packets routed through the DCM 310 will be transmitted out of the CIC routing node 300 and on to Media Gateway Controller (MGC) 182 via IP communication link 352. As the SS7 and IP communication protocols are not inherently compatible, all SS7 message packets that are to be sent over the IP link 352 are first encapsulated within a TCP/IP routing envelope prior to transmission. This IP encapsulation is performed on the DCM 310 by the IP level 1 & 2 process 342. Preferred packet formats for encapsulating various types of SS7 messages in IP packets are described in Internet Engineering Task Force (IETF) INTERNET DRAFT entitled Transport Adapter Layer Interface, May 28, 1999, the disclosure of which is incorporated herein by reference in its entirety. Furthermore, a Tekelec Transport Adapter Layer Interface (TALI™) is described in commonly-assigned, co-pending U.S. Patent Application No. 60/137,988, the disclosure of which is incorporated herein by reference in its entirety.

Once again, the description of LIM and DCM subcomponents provided above is limited to those subcomponents that are relevant to the sample implementation scenarios illustrated herein. For a comprehensive discussion of additional LIM and DCM operations and functionality, the above-referenced Tekelec publications can be consulted.

In the embodiment shown in FIG. 5, the CRD process 320 resides in one or more blocks of high speed random access memory (RAM) that are located on the LIM and DCM cards 302 and 310, respectively. However, it will be appreciated by those skilled in the art of high-performance computing systems that such a software process and any databases associated therewith could be configured such that some or all of the information is stored on a high density, fast access physical storage media such as magnetic or optical discs.

CIC Based Routing Process

For purposes of illustration, the path of a typical MGC-bound SS7 ISUP IAM message requiring CIC routing node service is traced in FIG. 5 from reception at the CIC routing node 300 by the inbound LIM 302, through processing by LIM-based HMRT process 318, and on to the outbound DCM 310. A detailed flow chart of CIC related ISUP IAM message processing steps is presented in FIG. 6, and may be used in conjunction with the schematic diagram shown in FIG. 5 to better understand CIC processing methodology.

Figure 6:
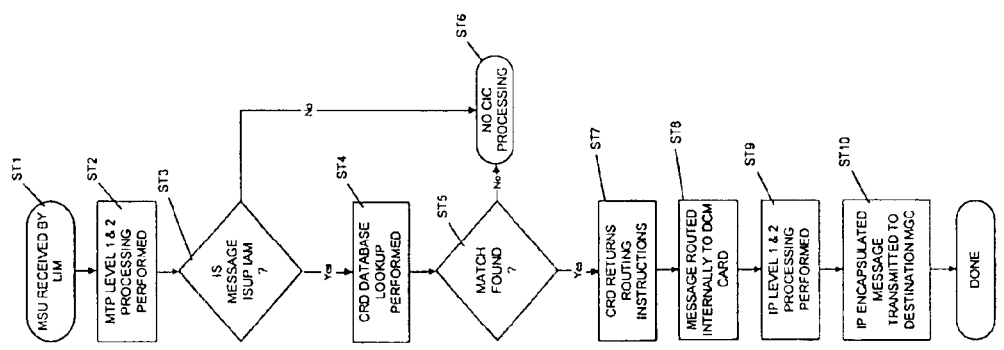
FIG. 6 is a flow chart diagram illustrating an implementation of CIC based routing decision processing of an ISUP IAM message according to an embodiment of a CIC packet routing node of the present invention.
Figure 8:
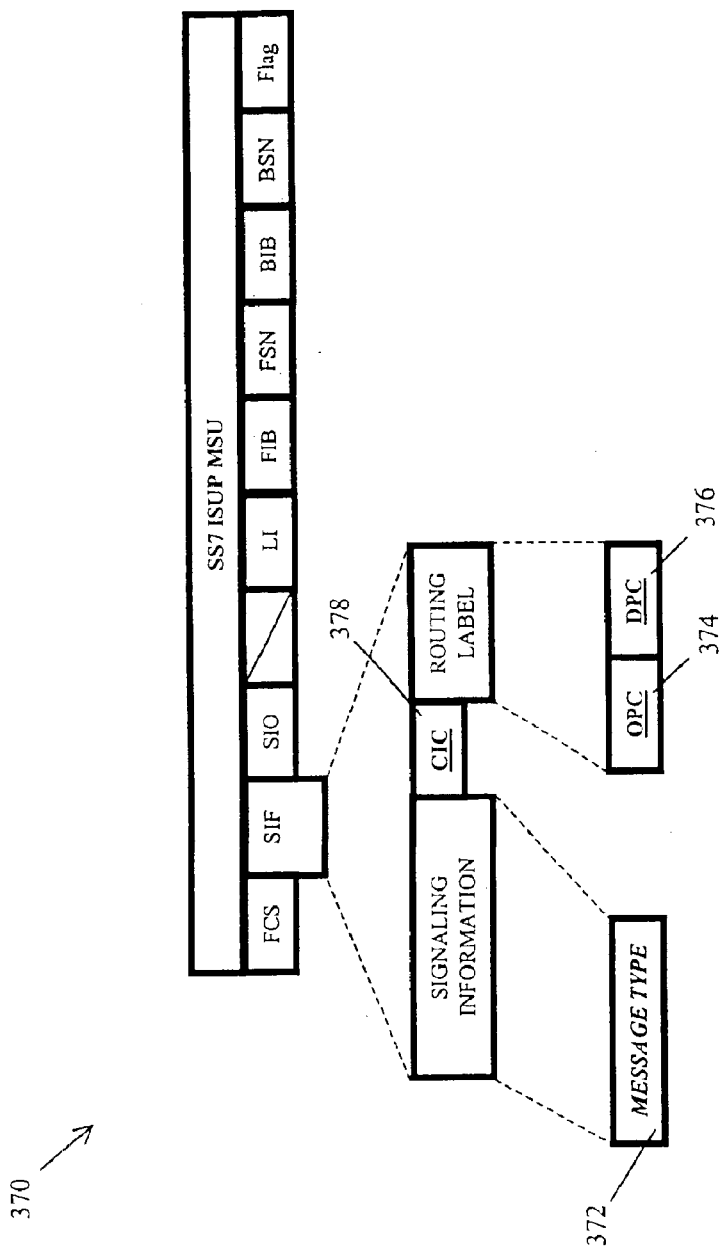
FIG. 8 is a diagram that illustrates a typical message structure associated with a Signaling System 7 (SS7) ISUP IAM message.

Beginning with step STI in FIG. 6, an incoming ISUP IAM message is received at the inbound LIM module 302. For the purposes of illustration, it should be assumed that the ISUP IAM message includes an OPC value of 1-1-1, a DPC value of 1-1-2, and a CIC value of 3. In step ST2, the incoming ISUP IAM message is received and processed by the MTP Level 1 and 2 process 312. With MTP Level 1 and 2 processing complete, the signaling message packet is temporarily buffered in the I/O queue 314 before being passed up the stack to the MTP Level 3 HMDC process 316, where SCCP type discrimination processing is performed. In the example shown in FIG. 5, HMDC process 316 examines the message packet routing label and determines that the DPC of the packet is the PC (1-1-2) of the MGC node 182, and subsequently passes the message packet to HMRT process 318 for further processing. HMRT process 318 receives the packet and subsequently examines a number of fields or parameters contained within the message. Shown in FIG. 8 is the structure of a typical ISUP IAM message, generally indicated by the numeral 370. HMRT process 318 first examines a message type parameter 372 in order to determine whether the received message is an ISUP IAM type message (ST3). If, through examination of the message type parameter 372, HMRT process 318 determines that the received message is an ISUP IAM message, then HMRT process 318 next extracts an Originating Point Code (OPC) parameter 374, a Destination Point Code (DPC) parameter 376, and a Circuit Identification Code (CIC) parameter 378 from the received message. Once again, In the example presented herein, the OPC parameter has a value of 1-1-1, the DPC parameter has a value of 1-1-2, and the CIC parameter has a value of 3. Using the OPC, DPC, and CIC values extracted from the received message, HMRT process 318 performs a lookup in the CRD process 320 (ST4). If an entry is located within the CRD database process 320 corresponding to the received message OPC, DPC, and CIC values, stored data associated with the OPC-DPC-CIC key is returned by the CRD process 320 (ST7). Once again, as indicated in FIG. 7, such stored data might include, but is not limited to: a destination node IP Hostname value, which in the illustrated embodiment comprises an IP address; a destination node TCP or UDP Port value; a destination node Status indicator; and a destination node Accounting or Billing subsystem indicator. In an alternative embodiment, Hostname field may include a host domain name, rather than an IP address. In addition, although the Hostname field in the illustrated embodiment contains 32-bit IPv4 addresses for the destination nodes, the present invention is not limited to IPv4 addresses. For example, in an alternative embodiment the Hostname field may contain 128-bit IPv6 addresses.

It will be appreciated, in the event that the received message is not an ISUP IAM message or that there is no entry included within the CRD database corresponding to the received message OPC, DPC, and CIC values, no further CIC based routing is performed on the message (ST6). As discussed above, under such conditions, the message is simply routed using standard or conventional SS7 routing techniques as described in the above referenced Eagle® STP and IP$^7$ Secure Gateway™ documents.

In the example presented herein, the CRD database lookup locates a match and the information returned by the CRD database process 320 is used, at least in part, to determine a network address associated with a target or destination MGC node (ST5). Referring again to FIG. 7, it will be appreciated that the matching entry in the CRD database 320 (OPC: 1-1-1, DPC: 1-1-2, CIC: 3) returns an IP node address comprising an IP Address of 101.10.23.45 and a Port number of 45. In the example scenarios presented herein, the destination MGC node is assumed to be connected to a CIC routing node of the present invention via a TCP/IP based communication pathway. However, it should be appreciated that the present invention is not limited in scope to the use of such TCP/IP protocol based communication links. In general, the present invention could be implemented using any number of packet network communication protocols. In any event, once the network address of the destination MGC node is returned by CRD process 320, the message can be internally routed to the appropriate outbound LIM or DCM card (ST8). In the particular example shown in FIG. 5, the appropriate outbound link card is DCM 310 or, in other words, DCM 310 is configured so as to generally facilitate communications with the node corresponding to the IP Address 101.10.23.45 and the Port Number 45. Consequently, the message packet is internally routed across the IMT bus 304 to DCM 310, where it is received by the I/O queue process 340. Eventually, the modified message packet is passed from the I/O queue 340 on to the IP Level 2 and Level 1 process 342 where properly formatted IP routing label information is applied to the packet prior to transmission across IP link 352 (ST9). Once again, it should be appreciated that the above referenced IP routing label information corresponds, at least in part, to the network address returned by the CRD database lookup operation. Following successful IP Level 1 & 2 processing, the message packet is transmitted via IP link 352 to the destination MGC node 182 (ST10).

CIC Routing Node and Call Setup Messaging

Figure 9:
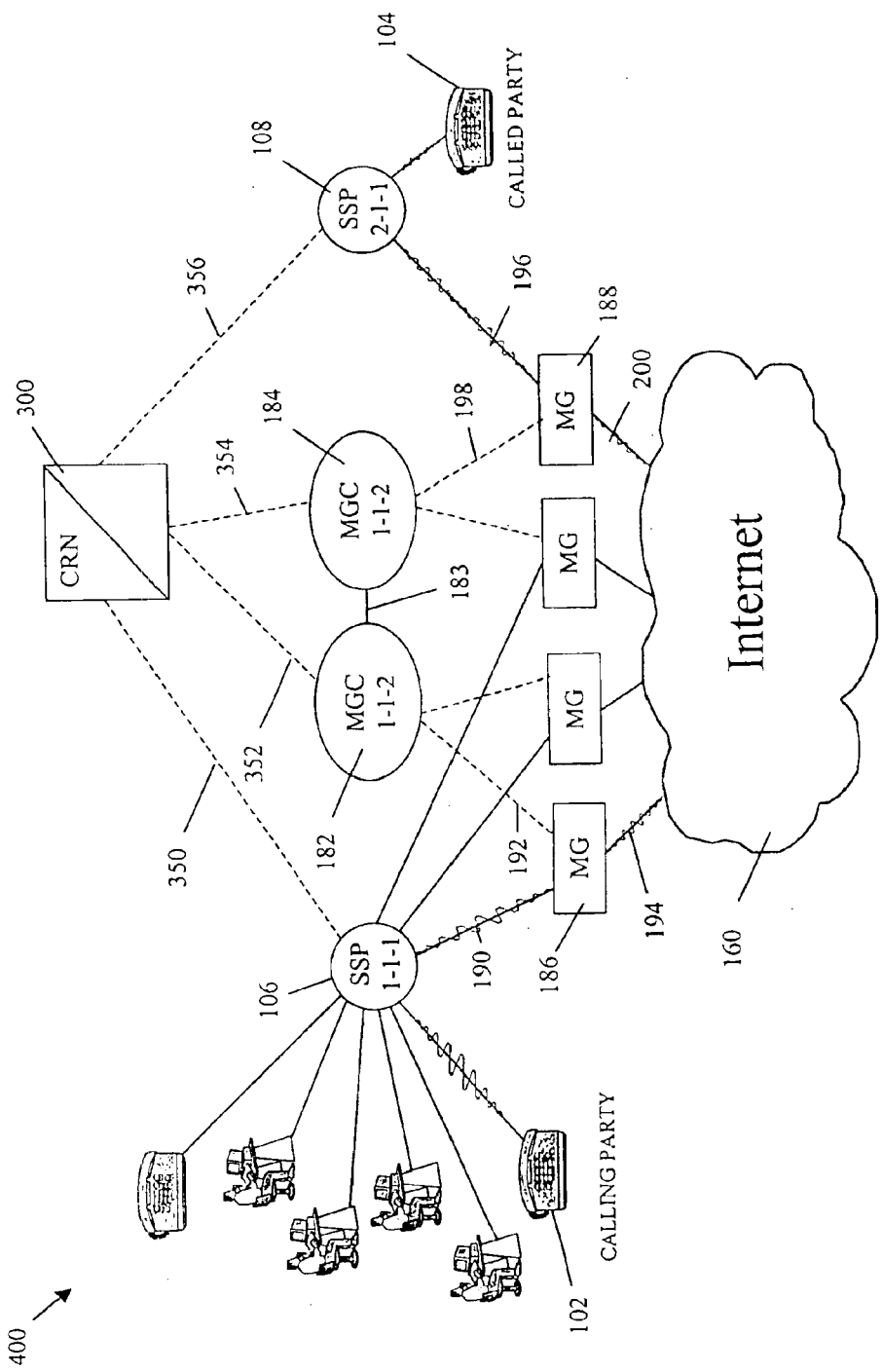
FIG. 9 is a network diagram illustrating an embodiment of the present invention where multiple MGC nodes each are assigned the same SS7 network address point code.

Shown in FIG. 9 is a typical network implementation of a CIC routing node of the present invention. As such, FIG. 9 includes a communications network, generally indicated by the numeral 400. Communications network 400 includes both SS7 based signaling facilities as well as equipment and facilities necessary for transmitting voice communications over a data-type network, as opposed to a traditional voice-type network. More particularly, network 400 includes a calling party 102, a called party 104, an originating End Office (EO) or Service Switching Point (SSP) 106, a terminating EO or SSP 108, and CIC routing node 300. Originating SSP 106 is communicatively coupled to calling party 102, and is also coupled via an SS7 communication link 350 to CIC routing node 300. In a similar manner, terminating SSP 108 is communicatively coupled to called party 104, and further coupled via an SS7 communication link 356 to CIC routing node 300. As such, SS7 signaling messages can be communicated between SSP 106, CIC routing node 300, and SSP 108 via dedicated SS7 signaling links.

Network 400 also includes a first Media Gateway Controller (MGC) node 182 which is connected to CIC routing node 300 via an IP connection 352, and a second Media Gateway Controller (MGC) node 184 which is also connected to CIC routing node 300 via an IP connection 354. Furthermore, MGC nodes 182 and 184 are communicatively coupled via a communication link 183. With particular regard to communication link 183, those skilled in the art of communication networking will appreciate that a Local Area Network (LAN) or Wide Area Network (WAN) could provide the same communication functionality as the discrete link 183 shown in FIGS. 9 and 10. Once again, it will be appreciated that MGC nodes 182 and 184 have an identical SS7 network address or point code, 1-1-2, and that the assignment of identical SS7 point codes to two nodes operating within the network is typically not possible. It is the CIC routing node of the present invention that directly facilitates such SS7 point code-consolidation within a network, and the technique by which this functionality is achieved is discussed in detail below.

Further connected to each of the Media Gateway Controller, (MGC) nodes 182 and 184 is a plurality of Media Gateway (MG) nodes. As indicated in FIG. 9, one of the MGs connected to MGC 182 via a communication link 192 is MG node 186. MG 186 is further communicatively coupled to originating SSP 106 via a data-grade communication trunk 190. In a similar manner, MG node 188 is connected to MGC 184 via a communication link 198 and simultaneously to terminating SSP 108 via a data-grade communication trunk 196. Each of the MG nodes 186 and 188 is also communicatively coupled to data network 160 via data links 194 and 200, respectively. It will be appreciated that data network 160 is comprised of a number of data network components that collectively provide the functionality associated with such a network, and more specifically provide a reliable communications pathway for messages sent between MG 186 and MG 188. A detailed discussion of such data networks and their components is beyond the scope of this disclosure and consequently will not be discussed in detail herein.

Figure 1:
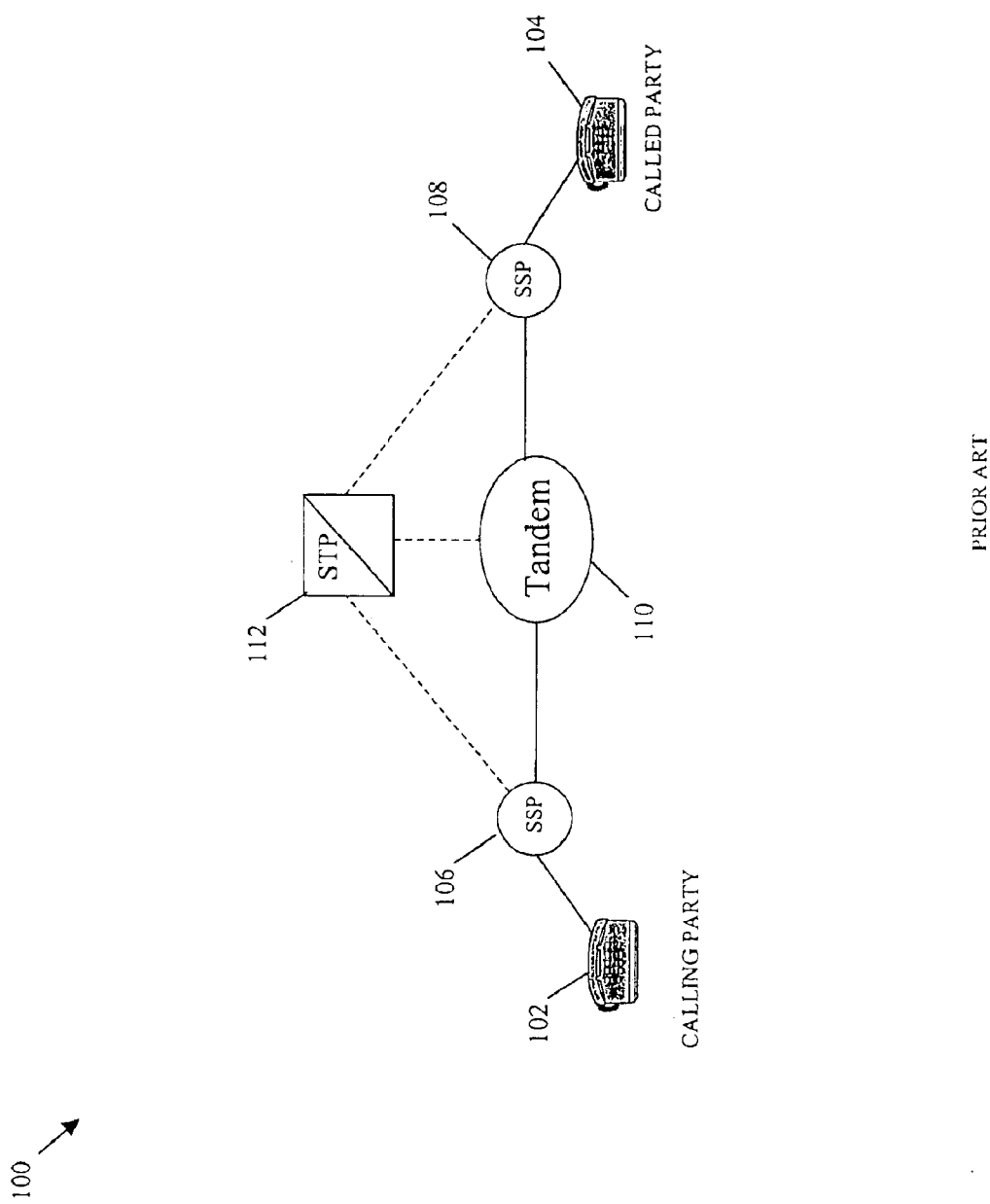
FIG. 1 is a prior art network diagram representation of a typical voice-type telephone call in the public switched telephone network (PSTN)
Figure 2:
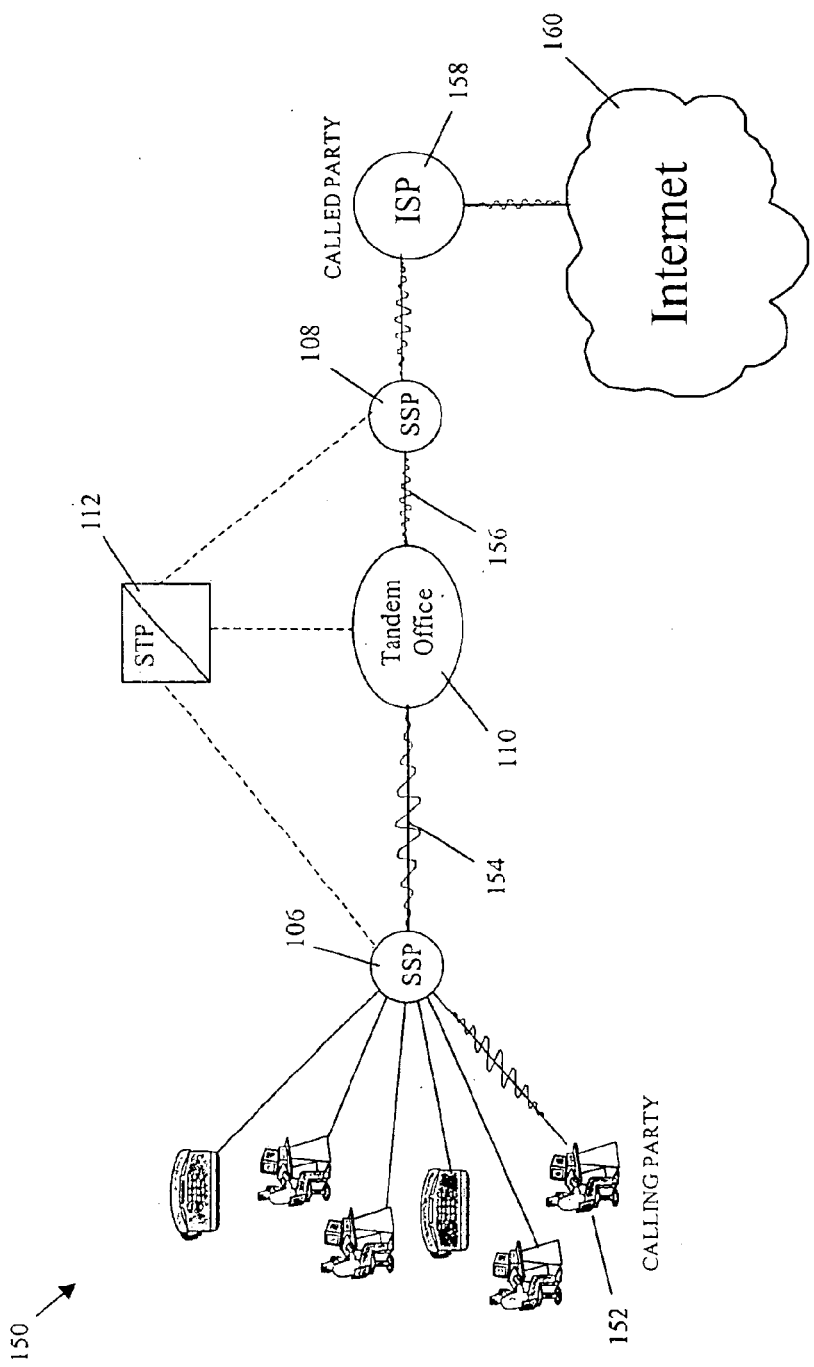
FIG. 2 is a prior art network diagram of a data or Internet-type telephone call in the PSTN using an Internet Service Provider (ISP) to provide access to a data network.
Figure 3:
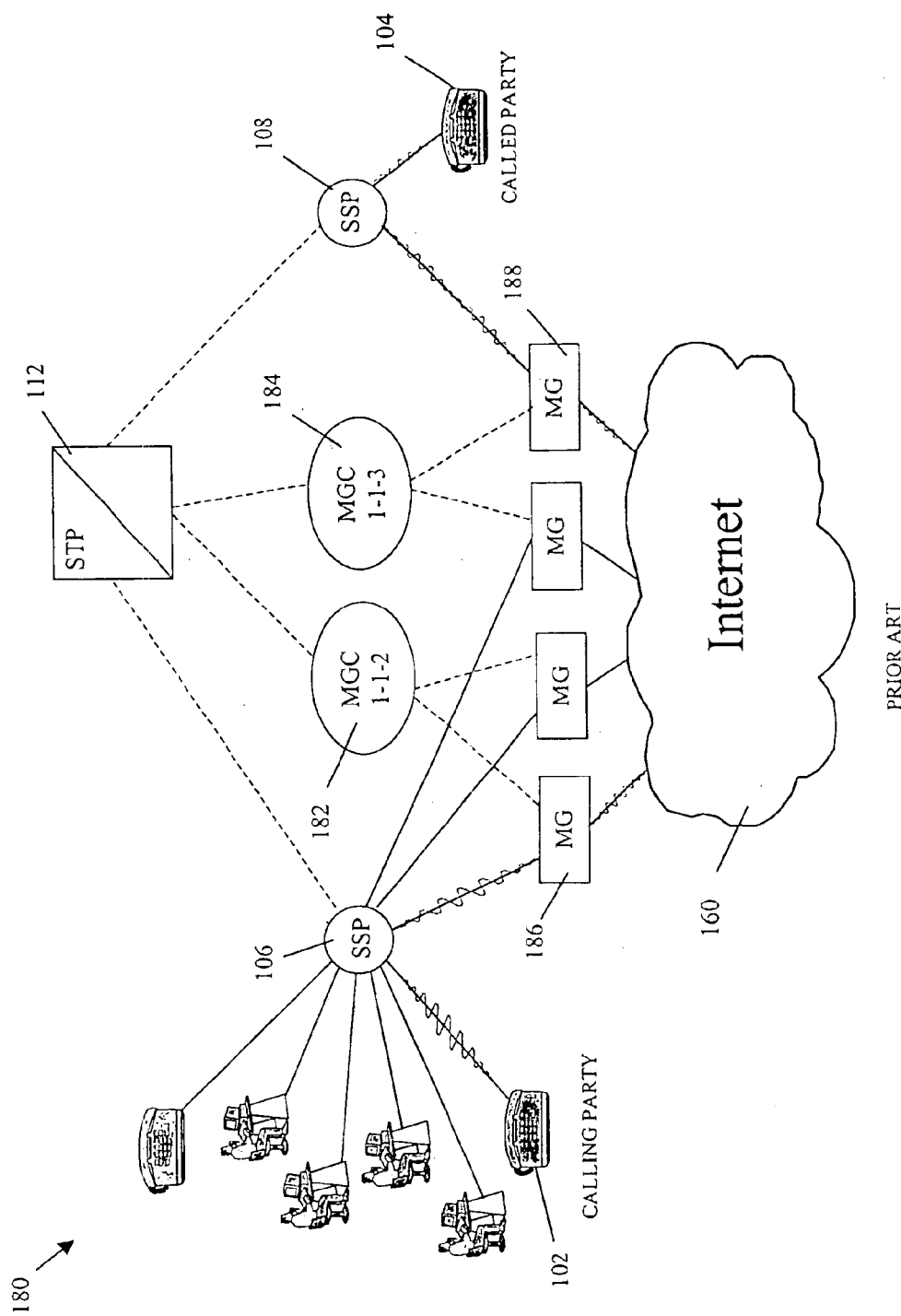
FIG. 3 is a prior art network diagram of a data or Internet-type telephone call in the PSTN using a Media Gateway Controller (MGC) to provide access to a data network.

Generally illustrated in FIG. 9 is a voice-type call that employs datagrade communication trunks and a data network, such as the Internet, to facilitate the call. Such a call completion scenario is similar to that previously described in FIG. 3, with the key exception of the use of a single SS7 point code to represent both MGC nodes, 182 and 184. Once again, the ability to add multiple MGC-type nodes to a network without requiring a different, unique SS7 point code for each added MGC-type node represents a major operational benefit for network operators. As discussed above, such is the case because there are a finite number of SS7 network point codes available for use by all network operators that deploy SS7 networks. At present, the acquisition of new SS7 point codes represents a significant problem for network operators attempting to expand their networks by deploying additional service nodes, such as MGC-type nodes.

It will be appreciated that in the call completion scenario shown in FIG. 9, communication pathways or segments are established between calling party 102 and originating SSP 106, between SSP 106 and MG 186, between MG 186 and data network 160, between data network 160 and MG 188, between MG 188 and terminating SSP 108, and between and SSP 108 and called party 104. In such a manner, a voice-type communication pathway is effectively formed between calling and called parties 102 and 104, respectively.

Figure 10:
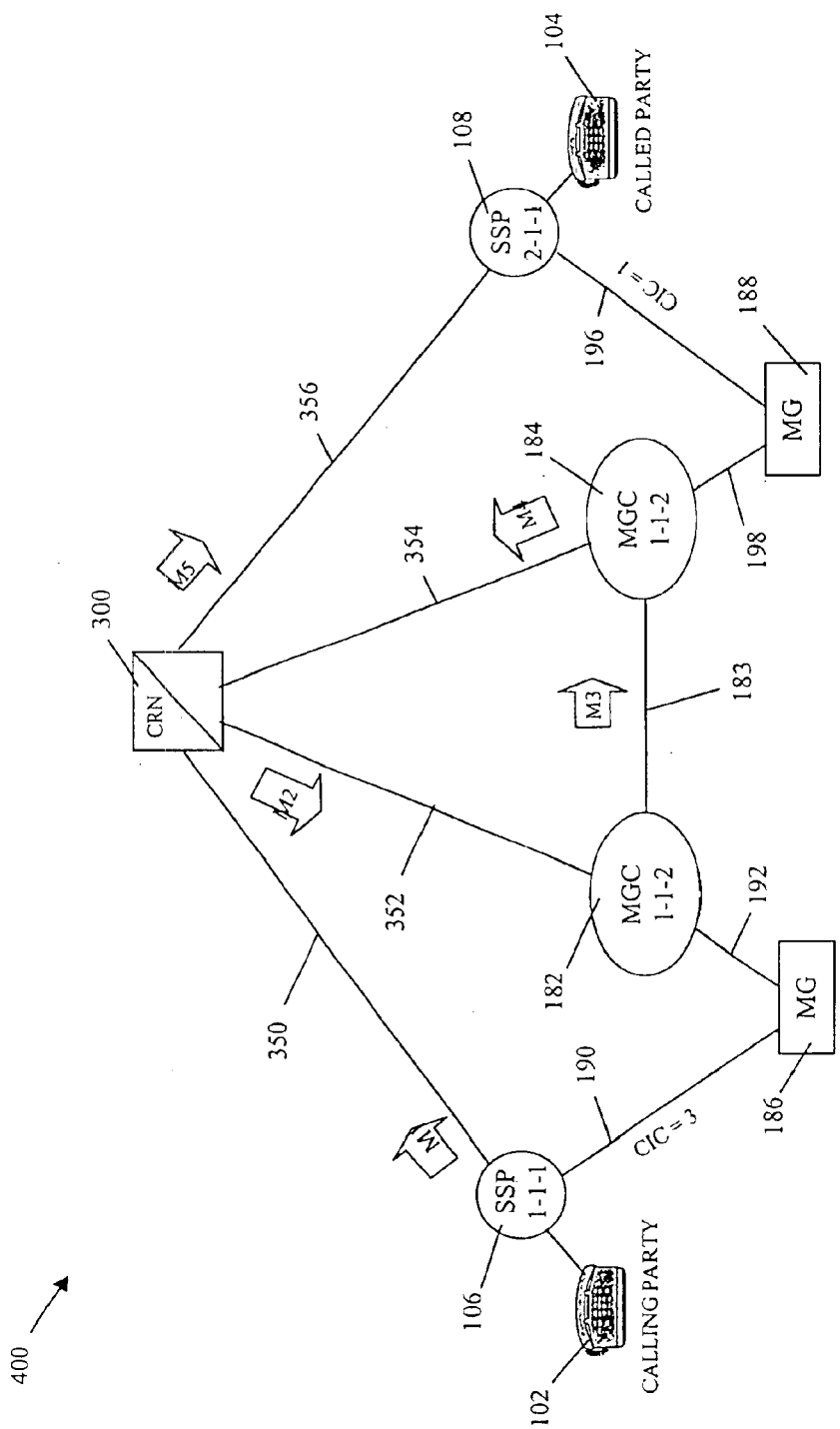
FIG. 10 is a network diagram illustrating SS7 ISUP IAM message flows associated with an embodiment of the present invention where multiple MGC nodes each are assigned the same Signaling System 7 (SS7) network address point code.

Shown in FIG. 10 is the portion of the communication network 400 that is involved specifically with the setup of the voice-type call scenario presented in FIG. 9. FIG. 10 further illustrates the basic SS7 ISUP IAM call setup signaling message flows associated with the call scenario shown in FIG. 9. As such, it will be appreciated that in response to a call request by calling party 102 (i.e., the dialing of a telephone number associated with called party 104), originating SSP 106 formulates an SS7 ISUP IAM message M1 which includes an OPC: 1-1-1, DPC: 1-1-2, and CIC: 3. That is, SSP 106 has reserved circuit 3 in the communication trunk that connects MG 186 and SSP 106, and notification is being sent to MG 186 to reserve this trunk circuit. ISUP IAM message M1 is transmitted via SS7 communication link 350 to CIC routing node 300. In a manner similar to that described above, and generally illustrated in FIG. 5, message M1 is received and examined by CIC routing node 300. Given that the message M1 is an ISUP IAM type SS7 signaling message, CIC routing node 300 performs a lookup in a CIC Routing Database (CRD) such as that presented in FIG. 7. Using the OPC-DPC-CIC parameter values as a CRD database lookup key, it will be further appreciated from FIG. 7 that CIC routing node 300 determines that, of the two MGC nodes corresponding to point code 1-1-2, message M1 should be routed to MGC 182, as MGC 182 controls the MG node that services the trunk circuit requested by SSP 106. As such, it will be appreciated that MGC 182 has been assigned an IP address and port number corresponding to the IP Address value 101.10.23.45 and Port number 45 obtained from the database lookup.

With the determination made by CIC routing node that message M1 should be routed to MGC 182, message M1 is encapsulated in an appropriately addressed IP routing envelope and transmitted via IP communication link 352 to MGC 182 as message M2. As the communication technique employed between MGC 182 and MG 186 is not particularly relevant to the CIC routing node of the present invention, a detailed discussion of such is not presented herein. It should suffice to state that MGC 182 receives message M2 from CIC routing node 300 and subsequently signals the adjacent MG 186 via communication link 192 such that MG 186 reserves trunk circuit 3, as requested by SSP 106.

Using information contained within the message M2, MGC 182 next formulates a message M3 which effectively instructs MGC 184 that a trunk circuit connected to terminating SSP 108 needs to be reserved or acquired in order to complete the current call setup process. It should be appreciated that message M3 is not an SS7 ISUP IAM type message, and consequently does not rely on SS7 addressing point codes with regard to routing. As such, the duplicate nature of the SS7 point codes assigned to both MGC 182 and MGC 184 does not pose a problem. Numerous protocols have been proposed and are currently under consideration for use in such voice-over-data communication schemes, including Session Initiation Protocol (SIP) and H.323 protocols. As the particular communication methods and protocols used to facilitate communication between two such MGC nodes is not particularly relevant to the present invention and is essentially beyond the scope of this disclosure, a detailed discussion of this aspect of the call setup process will not be presented herein.

In any event, it will be appreciated that MGC 184 is notified by message M3 that MG 188 should reserve a trunk circuit connected to SSP 108 for use with the current call attempt. In response, MGC 184 formulates an ISUP IAM message M4 that includes information regarding the specific trunk circuit reserved (CIC=1) by MG 188 and the DPC (DPC=2-1-1) of the terminating SSP 108 that controls the distant end of the selected trunk circuit. In the particular example presented herein, it is assumed that communication link 354 is an IP type link, and as such message M4 will typically assume the form of an IP encapsulated SS7 ISUP IAM message. It will be appreciated that if link 354 were a dedicated SS7 link, message M4 would not require IP encapsulation. Message M4 is next transmitted via link 354 to CIC routing node 300.

As indicated in FIG. 10, message M4 is received, de-capsulated and examined by CIC routing node 300. Given that the message M4 is an ISUP IAM type SS7 signaling message, CIC routing node 300 first performs a lookup in a CIC Routing Database (CRD) such as that presented in FIG. 7. Using the OPC-DPC-CIC parameter values as a CRD database lookup key, it will be appreciated from FIG. 7 that no match is found in the CRD database. Consequently, message M4 is routed within CIC routing node 300 using the DPC (2-1-1) specified in the message. Consequently, message M4 is routed onto SS7 link 356 and delivered to SSP 108 as message M5. SSP 108 receives the ISUP IAM message M5 and subsequently uses the CIC information contained in the message to reserve the trunk circuit (CIC=1) selected by MG 188.

CIC Routing Node with Accounting Subsystem

Figure 11:
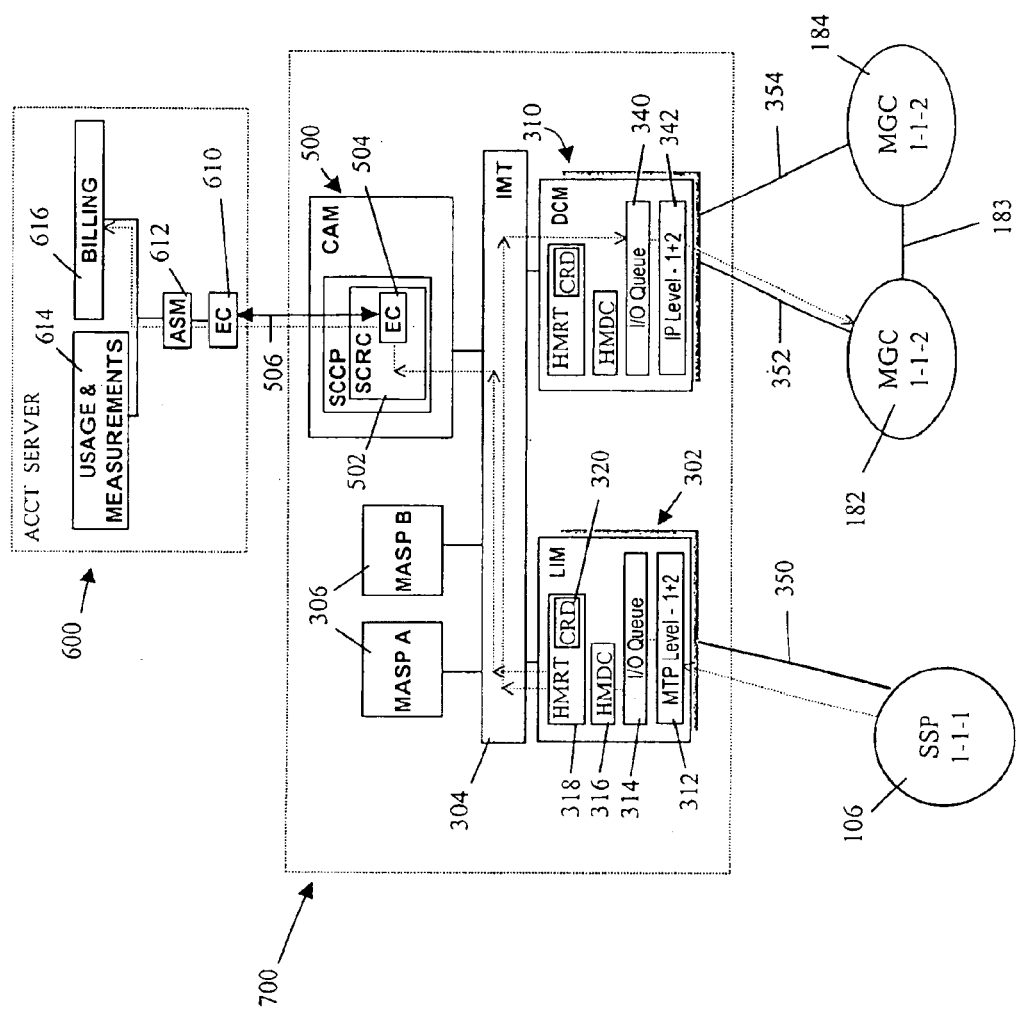
FIG. 11 is a schematic diagram of a system architecture according to another embodiment of a CIC packet routing node of the present invention, generally illustrating an integrated CIC based accounting subsystem.

Shown in FIG. 11 is an another embodiment of a CIC routing node of the present invention that is provisioned to update and maintain an accounting subsystem based on the number and type of messages routed based on CIC values. FIG. 11 includes a CIC routing node, generally indicated by the numeral 700, that is similar in design and basic function to CIC routing node 300 previously presented in FIG. 5.

As with CIC routing node 300 described above, it will be appreciated that CIC routing node 700 is communicatively coupled to an EO or SSP 106 via an SS7 signaling link 350, to a first Media Gateway Controller (MGC) node 182 via an IP connection 352, and to a second Media Gateway Controller (MGC) node 184 via an IP connection 354. MGC nodes 182 and 184 are also communicatively coupled together via an IP link 183. It will be further appreciated that the MGC nodes 182 and 184 have an identical SS7 network address or point code, 1-1-2.

As further illustrated in FIG. 11, CIC packet router node 700 includes a high speed Interprocessor Message Transport (IMT) communications bus 304. Communicatively coupled to IMT bus 304 are a number of distributed processing modules or cards including; a pair of Maintenance and Administration Subsystem Processors (MASPs) 306, an SS7 capable Link Interface Module (LIM) 302, an Internet Protocol (IP) capable Data Communication Module (DCM) 310, a CIC Accounting Module (CAM) 500, and an external Accounting Server 600. These modules are physically connected to the IMT bus 304 such that signaling and other type messages may be routed internally between all active cards or modules. For simplicity of illustration, only a single LIM 302, DCM 310, and CAM 500 are included in FIG. 11, although multiple cards of each type may be simultaneously provisioned as required.

Focusing on LIM card functionality, it will be appreciated that LIM 302 is comprised of a number of sub-component processes including, but not limited to; SS7 MTP level 1 & 2 processes 312, an I/O buffer or queue 314, an SS7 MTP level 3 layer HMDC process 316, and an HMRT process 318. HMRT process 318 is generally responsible for examining an incoming message and determining to which LIM or DCM the message should be delivered for subsequent outbound transmission. Consequently, HMRT process 318 includes a CIC Routing Database (CRD) 320 that generally includes information essential to the routing of ISUP IAM messages that are destined for a MGC or similar type network element. Furthermore, in the present embodiment, HMRT process 318 is also responsible directing an SCCP-encapsulated copy of the incoming ISUP IAM to CAM 500 in the event that a CRD database lookup returns an Accounting flag value that indicates the need for accounting of messages destined for a particular MGC or MG node. In the embodiment described herein, CRD 320 employs a triplet key field structure that includes Originating Point Code (OPC), Destination Point Code (DPC), and Circuit Identification Code (CIC) as indicated in FIG. 7. Furthermore, the CRD 320 may contain a number of data fields including, but not limited to, an Internet Protocol (IP) Hostname, an IP Port, a target node Status, and an Accounting subsystem indicator. CRD database 320 could also contain information related to MGC node ownership and, consequently, message routing decisions can be based, at least in part, upon MGC node ownership.

Once again, it will be appreciated that, in the particular embodiment described herein, the HMRT process 318 is configured such that the CRD process 320 is only accessed in response to the receipt of an ISUP IAM message. Consequently, in response to receiving an ISUP IAM message that is destined for an MGC or similar node, a lookup would be performed in CRD process 320 and the resulting information returned by the CRD 320 would be used to further route the message. If an ISUP IAM message that was not destined for an MGC or similar node were received, a lookup in CRD process 320 might be performed but no matching entry would be found. In such a case, standard or conventional routing of the message would be performed in a manner similar to that described in the above referenced Eagle® STP and IP[7] Secure Gateway™ documents. In much the same manner, all non ISUP IAM messages received by the CIC routing node of the present invention would be routed using the techniques and processes described in the above referenced Eagle® STP and IP[7] Secure Gateway™ documents. As such, a detailed discussion of the standard or conventional message routing techniques and processes employed by the Eagle® STP and IP[7] Secure Gateway™ will not be discussed in detail herein.

Again, MTP level 1 and 2 layer process 312 provides the facilities necessary to send and receive digital data over a particular physical media/physical interface, as well as to provide error detection/correction and sequenced delivery of all SS7 message packets. 110 queue 314 provides for temporary buffering of incoming and outgoing signaling message packets. MTP level 3 HMDC process 316 receives signaling messages from the lower processing layers and performs a discrimination function, effectively determining whether an incoming SS7 message packet requires internal processing or is simply to be through switched. As discussed in detail above, the HMRT process 318 and associated CRD process 320 determine to which MGC node a particular ISUP IAM message should be routed based on the OPC, DPC, and CIC parameters contained therein, and more particularly to which outbound LIM or DCM card the message must be internally routed in order to reach the target MGC node. Additionally, based on the value of the Accounting flag indicator returned by a CRD database lookup, HMRT process 318 is also responsible for encapsulating a copy of the ISUP IAM message within an SCCP envelope, and delivering this copied message to CAM card 500 via IMT bus 304. It will be appreciated that a detailed discussion of the ISUP message copy and subsequent SCCP encapsulation techniques are described in commonly-assigned, co-pending U.S. patent application Ser. No. 09/503,541 filed Feb. 14, 2000, the disclosure of which is incorporated herein by reference in its entirety.

DCM 310, shown in FIG. 11, generally includes an I/O buffer or queue 340 and an IP level 1 & 2 process 342. It will be appreciated that outgoing message packets routed through the DCM 310 will be transmitted out of the CIC routing node 300 and on to Media Gateway Controller (MGC) 182 via IP communication link 352. As the SS7 and IP communication protocols are not inherently compatible, all SS7 message packets that are to be sent over the IP link 352 are first encapsulated within a TCP/IP routing envelope prior to transmission. This IP encapsulation is performed on the DCM 310 by the IP level 1 & 2 process 342.

CAM 500, presented in FIG. 11, includes a Service Connection Control Part (SCCP) subsystem controller known as a Signaling Connection Routing Controller (SCRC) process 502, and an high-speed Ethernet Controller (EC) 504. The SCRC process 502 is responsible for receiving and discriminating signaling messages at the SCCP level, and for subsequently directing the signaling messages to EC 504 for transport to and processing by the external Accounting Server 600.

External Accounting Server 600 includes a high-speed Ethernet Controller (EC) 610 which is adapted to communicate with CAM EC 504 via high-speed Ethernet link 506. Coupled to EC 610 is an Accounting Subsystem Manager (ASM) process 612 that is generally responsible for directing messages from the EC process 610 to the appropriate accounting subsystem process or processes. More particularly, Accounting Server 600 may be provisioned to support any number of applications including, but not limited to, a usage and measurements application 614, and a billing application 616. Such a usage and measurements application might collect and maintain data or statistics relevant to message throughput that required CIC based routing service. In a similar manner, billing application 616 might use data similar to that collected by usage and measurements application 614 in order to charge other service providers for CIC based routing services.

As such, an ISUP IAM signaling message destined for an MGC node would be copied and encapsulated within an SCCP wrapper by HMRT process 318 in response to a CRD database lookup that returned an Accounting flag value which indicated accounting subsystem processing was required. As indicated in FIG. 11, the SCCP encapsulated copy of the original ISUP IAM message is then internally transported via the IMT bus 304 to CAM card 500. The encapsulated message is received and generally processed SCRC controller process 502 and subsequently directed to high-speed EC process 504 for transport via Ethernet connection 506 to the Accounting Server 600. The message is received on the Accounting Server platform by the receiving EC process 610. EC process 610 subsequently delivers the message to the Accounting Subsystem Manager (ASM) process 612 where the message or information contained within the message is used to provide input to some or all of the provisioned accounting applications, such as usage and measurements application 614 and billing application 616.

Once again, it will be appreciated that regardless of the accounting subsystem application invoked, the message passed to the Accounting Server 600 is simply a copy of the original ISUP IAM message. It should also be appreciated that SCCP type encapsulation of the ISUP IAM message is not essential for operation of the CIC routing node of the present invention, nor is it essential that the entire ISUP IAM message (copy or original) be delivered to the Accounting Server 600. Key or critical information content of the ISUP IAM message could be extracted from the original message and delivered to the Accounting Server in a variety of formats, while achieving the same overall functionality.

Although the embodiment illustrated in FIG. 11 includes an external accounting module, the present invention is not limited to such an embodiment. For example, in an alternative embodiment, some or all of the functionality of Accounting Server 600 may be incorporated within CIC routing node 700.

It will be understood that various details of the invention may be changed without departing from the scope of the invention. Furthermore, the foregoing description is for the purpose of illustration only, and not for the purpose of limitation—the invention being defined by the claims.

What is claimed is:

1. A network element capable of routing a signaling message based at least in part on a Circuit Identification Code (CIC) parameter that is specified within the signaling message, the network element comprising:
   (a) a first communication module capable of transmitting messages to and receiving messages from a first communications network;
   (b) a second communication module capable of transmitting messages to and receiving messages from a second communications network;
   (c) a CIC Routing Database (CRD) that is uniquely keyed or indexed at least in part by CIC values and that contains routing instructions associated with each unique key or index value; and
   (d) a message routing process associated with one of the first and second communication modules for performing a lookup in the CIC routing database based on at least a CIC value extracted from a first message received by one of the first and second communication modules to locate routing instructions for the first message, wherein performing a lookup in the CIC routing database based on at least a CIC value extracted from the first message includes performing a lookup in the CIC routing database based on the CIC value extracted from the first message in combination with at least one point code extracted from the first message, and wherein performing a lookup in the CIC routing database based on the CIC value and at least one point code extracted from the first message includes selecting among entries in the CIC routing database corresponding to media gateway controllers that share a point code.

2. The network element of claim 1 wherein the first message is a Signaling System 7 (SS7) signaling message.

3. The network element of claim 2 wherein the SS7 signaling message is an ISDN User Part (ISUP) message signaling unit (MSU).

4. The network element of claim 3 wherein the ISUP MSU is intended to setup a voice-type call through a data network.

5. The network element of claim 4 wherein the data network is an Internet Protocol (IP) network.

6. The network element of claim 4 wherein the data network is an Asynchronous Transfer Mode (ATM) network.

7. The network element of claim 4 wherein the data network is the Internet.

8. The network element of claim 1 wherein the first communications network is an SS7 network.

9. The network element of claim 1 where the second communications network is an Internet Protocol (IP) network.

10. The network element of claim 1 wherein the first communication module is a Signaling System 7 (SS7) Link Interface Module (LIM).

11. The network element of claim 1 wherein the second communication module is an Internet Protocol (IP) capable Data Communication Module (DCM).

12. The network element of claim 1 wherein each CRD database record includes an IP address associated with a Media Gateway Controller (MGC) type node.

13. The network element of claim 1 wherein the CIC routing database contains a plurality of records and each record includes operational status information associated with a Media Gateway Controller (MGC) type node.

14. The network element of claim 1 wherein the CIC routing database contains a plurality of records and each record includes ownership information associated with a Media Gateway Controller (MGC) type node.

15. The network element of claim 1 wherein the CIC routing database contains a plurality of records and each record includes an accounting or billing indicator associated with a Media Gateway Controller (MGC) type node.

16. The network element of claim 1 wherein the first communication module comprises an SS7 link interface module (LIM) and the message routing process resides on the LIM.

17. The network element of claim 1 wherein the second communication module comprises an SS7 Data Communications Module (DCM) and the message routing process resides on the DCM.

18. The network element of claim 1 where the data that comprises the CRD database is maintained in high speed, random access memory.

19. The network element of claim 1 where the data that comprises the CRD database is maintained on high speed, optical disc storage media.

20. The network element of claim 1 wherein the message routing process is adapted to examine the type of messages received by the first and second communication modules and to perform the lookup in the CIC routing database in response to determining that the message is an ISDN user part (ISUP) message.

21. The network element of claim 1 wherein each key or index value includes an SS7 Destination Point Code (DPC) value and a CIC value.

22. The network element of claim 21 wherein each key or index value further includes an SS7 Origination Point Code (OPC).

23. The network element of claim 1 further comprising an Accounting Subsystem that is adapted to receive and process a second message associated with the first message that requires CIC based routing.

24. The network element of claim 23 wherein the second message is a copy of the first message received by the network element.

25. The network element of claim 24 wherein the second message is encapsulated within a Signaling Connection Control Part (SCCP) envelope.

26. The network element of claim 23 wherein the Accounting Subsystem includes a usage and measurements application.

27. The network element of claim 23 wherein the Accounting Subsystem includes a billing application.

28. A method for routing a message in a communications network based on Circuit Identification Code (CIC) information contained within the message, the method comprising:

(a) receiving a message having an SS7 destination point code value (DPC), an SS7 origination point code (OPC) value, and a CIC value from a first communication network;

(b) determining whether the message is an ISDN User Part (ISUP) message;

(c) in response to determining that the message is an ISUP message, performing a lookup in a CIC Routing Database (CRD) using at least the CIC value contained in the message wherein performing a lookup in a CIC routing database using at least the CIC value contained in the message includes performing a lookup in the CIC routing database based on the CIC value and at least one point code contained in the message, and wherein performing a lookup in the CIC routing database based on the CIC value and at least one point code in the message includes selecting among entries in the CIC routing database corresponding to media gateway controllers that share a point code:

(d) using information returned by the CRD lookup to select an appropriate outbound communication link on which the message may be transmitted; and (e) transmitting the message over the outbound communication link into a second communication network.

29. The method of claim 28 wherein the message is a Signaling System 7 (SS7) signaling message.

30. The method of claim 29 wherein the SS7 signaling message is an ISUP message signaling unit (MSU).

31. The method of claim 28 wherein the first communication network is an SS7 network.

32. The method of claim 28 where the second communication network is an Internet Protocol (IP) network.

33. The method of claim 28 wherein determining whether the message is an ISUP message includes examining a Message Type parameter contained within the message.

34. The method of claim 28 wherein performing a lookup in the CIC routing database based on the CIC value and at least one point code in the message includes performing the lookup using a combination of DPC and CIC values contained in the message.

35. The method of claim 34 wherein performing the lookup in the CIC routing database further includes performing the lookup using the OPC value contained in the message.

36. The method of claim 28 wherein the information returned by the CRD database includes a network address.

37. The method of claim 28 wherein the wherein the information returned by the CRD database includes an IP address and a port number.

38. The method of claim 28 wherein the information returned by the CRD database includes a status value that indicates the operational status of a particular network node.

39. The method of claim 28 further including, in response to determining that the message is an ISUP message, generating a copy of the ISUP message.

40. The method of claim 39 comprising delivering a copy of the ISUP message to an Accounting Subsystem.

41. The method of claim 40 wherein delivering a copy of the ISUP message to an Accounting Subsystem comprises encapsulating the copy of the ISUP message in a Signaling Connection Control Part (SCCP) envelope and delivering the encapsulated message to the Accounting Subsystem.

42. The method of claim 40 wherein the Accounting Subsystem includes a usage and measurements application.

43. The method of claim 40 wherein the Accounting Subsystem includes a billing application.

44. A method of routing a message from a first network element in a first communication network to a second network element in a second communication network, the method comprising:

(a) sending, from a first network element in a first communication network, a first message that includes an Origination Point Code (OPC) value, a Destination Point Code (DPC) value, and a Circuit Identification Code (CIC) value;

at a CIC routing node:

(b) receiving the first message;

(c) performing a lookup in a CIC Routing Database (CRD) using at least the CIC value contained in the first message, wherein performing a lookup in the CIC muting database using at least the CIC value contained in the first message includes performing a lookup in the CIC routing database using the CIC value in combination with at least one point code contained in the first message, and wherein performing a lookup in the CIC routing database using the CIC value in combination with at least one point code contained in the first message includes selecting among entries in the CIC routing database corresponding to media gateway controllers that share a point code;

(d) forming a second message, that is based on the first message, using information returned by the CRD lookup operation; and (e) routing the second message to a second network element in a second communication network.

45. The method of claim 44 wherein the first message is a Signaling System 7 (SS7) signaling message.

46. The method of claim 45 wherein the SS7 signaling message is an ISDN User Part (ISUP) message.

47. The method of claim 44 wherein the first communication network is an SS7 network.

48. The method of claim 44 where the second communication network is an Internet Protocol (IP) network.

49. The method of claim 44 wherein performing a lookup in the CIC routing database using the CIC value in combination with at least one point code contained in the first message includes performing the lookup using a combination of DPC and CIC values contained in the first message.

50. The method of claim 49 wherein performing the lookup in the CIC routing database further includes performing the lookup using the OPC value contained in the first message.

51. The method of claim 44 wherein the information returned by the CRD database includes a network address.

52. The method of claim 44 wherein the information returned by the CRD database includes an IP address and a port number.

53. The method of claim 44 wherein the information returned by the CRD database includes a status value that indicates the operational status of the second network element.

54. The method of claim 44 further including generating a copy of the first message.

55. The method of claim 54 comprising delivering a copy of the first message to an Accounting Subsystem associated with the CIC routing node.

56. The method of claim 55 wherein delivering a copy of the first message to an Accounting Subsystem comprises encapsulating a copy of the first message in a Signaling Connection Control Part (SCCP) envelope and delivering the encapsulated message to an Accounting Subsystem associated with the CIC routing node.

57. The method of claim 55 wherein the Accounting Subsystem includes a usage and measurements application.

58. The method of claim 55 wherein the Accounting Subsystem includes a billing application.

59. The method of claim 44 wherein the first network element is a Service Switching Point (SSP).

60. The method of claim 44 wherein the second network element is a Media Gateway Controller (MGC).

61. The method of claim 44 wherein the second message is an IP encapsulated ISUP message.

62. The method of claim 44 wherein the second message is a Session Initiation Protocol (SIP) formatted message.

63. The method of claim 44 wherein the second message is an H.323 formatted message.

64. A method of routing a message that is addressed to a point code which is shared by a plurality of network elements in a communication network, the method comprising:
   at a CIC routing node:
   (a) receiving a first message that includes an Origination Point Code (OPC) value, a Destination Point Code (DPC) value, and a Circuit Identification Code (CIC) value;
   (b) performing a lookup in a CIC Routing Database (CRD) using at least the CIC value contained in the first message;
   (c) forming a second message, that is based on the first message, using information returned by the CRD lookup operation, wherein performing a lookup in the CIC routing database using at least the CIC value contained in the first message includes performing a lookup in the CIC routing database using the CIC value in combination with at least one point code contained in the first message, and wherein performing a lookup in the CIC routing database using the CIC value in combination with at, least one point code contained in the message includes selecting among entries in the CIC routing database corresponding to media gateway controllers that share a point code; and
   (d) routing the second message to one of a plurality of network elements that share the DPC value specified in the first message.

65. The method of claim 64 wherein the first message is a Signaling System 7 (SS7) signaling message.

66. The method of claim 65 wherein the SS7 signaling message is an ISDN User Part (ISUP) message.

67. The method of claim 64 wherein the performing the lookup in the CIC routing database using the CIC value in combination with at least one point code includes performing the lookup using a combination of DPC and CIC values contained in the first message.

68. The method of claim 67 wherein performing the lookup in the CIC routing database further includes performing the lookup using the OPC value contained in the first message.

69. The method of claim 64 wherein the information returned by the CRD database includes a network address.

70. The method of claim 64 wherein the information returned by the CRD database includes an IP address and a port number.

71. The method of claim 64 wherein the information returned by the CRD database includes a status value that indicates the operational status of the second network element.

72. The method of claim 64 further including generating a copy of the first message.

73. The method of claim 72 comprising delivering the copy of the first message to an Accounting Subsystem associated with the CIC routing node.

74. The method of claim 72 comprising encapsulating the copy of the first message in a Signaling Connection Control Part (SCCP) envelope and delivering the encapsulated message to an Accounting Subsystem associated with the CIC routing node.

75. The method of claim 73 wherein the Accounting Subsystem includes a usage and measurements application.

76. The method of claim 73 wherein the Accounting Subsystem includes a billing application.

77. The method of claim 64 wherein the plurality of network elements include Media Gateway Controllers (MGCs).

78. The method of claim 64 wherein the second message is an IP encapsulated ISUP message.

79. The method of claim 64 wherein the second message is a Session Initiation Protocol (SIP) formatted message.

80. The method of claim 64 wherein the second message is an H.323 formatted message.

81. A computer program product comprising computer-executable instructions embodied in a computer-readable medium for performing steps comprising:
   at a CIC routing node:
   (a) receiving a first message that includes an Origination Point Code (OPC) value, a Destination Point Code (DPC) value, and a Circuit Identification Code (CIC) value;
   (b) performing a lookup in a CIC Routing Database (CRD) using at least the CIC value contained in the first message, wherein performing a lookup in the CIC routing database using at least the CIC value contained in the first message includes performing a lookup in the CIC routing database using the CIC value in combination with at least one point code contained in the first message, and wherein performing a lookup in the CIC routing database using the CIC value in combination with at least one point code includes selecting among entries in the CIC routing database corresponding to media gateway controllers that share a point code;
   (c) forming a second message, that is based on the first message, using information returned by the CRD lookup operation; and
   (d) routing the second message to one of a plurality of network elements that share the DPC value specified in the first message.

82. The computer program product of claim 81 wherein the first message is a Signaling System 7 (SS7) signaling message.

83. The computer program product of claim 82 wherein the SS7 signaling message is an ISDN User Part (ISUP) message.

84. The computer program product of claim 81 wherein performing a lookup in the CIC routing database using the CIC value in combination with at least one point code includes performing the lookup using a combination of DPC and CIC values contained in the first message.

85. The computer program product of claim 83 wherein performing the lookup further includes the OPC value contained in the first message.

86. The computer program product of claim 81 wherein the information returned by the CRD database includes a network address.

87. The computer program product of claim 81 wherein the information returned by the CRD database includes an IP address and a port number.

88. The computer program product of claim 81 wherein the information returned by the CRD database includes a status value that indicates the operational status of the second network element.

89. The computer program product of claim 81 further including generating a copy of the first message.

90. The computer program product of claim 89 comprising delivering the copy of the first message to an Accounting Subsystem associated with the CIC routing node.

91. The computer program product of claim 89 comprising encapsulating the copy of the first message in an SCCP envelope and delivering the encapsulated message to an Accounting Subsystem associated with the CIC routing node.

92. The computer program product of claim 90 wherein the Accounting Subsystem includes a usage measurements application.

93. The computer program product of claim 90 wherein the Accounting Subsystem includes a billing application.

94. The computer program product of claim 81 wherein the plurality of network elements include Media Gateway Controllers (MGCs).

95. The computer program product of claim 81 wherein the second message is an IP encapsulated ISUP message.

96. The computer program product of claim 81 wherein the second message is a Session Initiation Protocol (SIP) formatted message.

* * * * *